United States Patent
Mariani et al.

(10) Patent No.: US 11,351,566 B2
(45) Date of Patent: Jun. 7, 2022

(54) PORTABLE VARIABLE VOLUME PAINT SPRAY ENCLOSURE AND AIR SCRUBBER

(71) Applicants: Bart J Mariani, Joliet, IL (US); John Cheney, Somonauk, IL (US)

(72) Inventors: Bart J Mariani, Joliet, IL (US); John Cheney, Somonauk, IL (US)

( * ) Notice: Subject to any disclaimer, the term of this patent is extended or adjusted under 35 U.S.C. 154(b) by 546 days.

(21) Appl. No.: 16/034,640

(22) Filed: Jul. 13, 2018

(65) Prior Publication Data
US 2019/0015861 A1    Jan. 17, 2019

Related U.S. Application Data

(60) Provisional application No. 62/604,644, filed on Jul. 13, 2017.

(51) Int. Cl.
| | |
|---|---|
| *B05B 16/80* | (2018.01) |
| *E04H 15/14* | (2006.01) |
| *E04H 15/44* | (2006.01) |
| *B05B 16/40* | (2018.01) |
| *B05B 16/60* | (2018.01) |
| *F24F 7/06* | (2006.01) |
| *B60P 3/00* | (2006.01) |

(Continued)

(52) U.S. Cl.
CPC .............. *B05B 16/80* (2018.02); *B05B 16/40* (2018.02); *B05B 16/60* (2018.02); *E04H 15/14* (2013.01); *E04H 15/44* (2013.01); *B05B 14/43* (2018.02); *B60P 3/00* (2013.01); *F24F 7/065* (2013.01); *F24F 13/0209* (2013.01); *F24F 13/28* (2013.01)

(58) Field of Classification Search
CPC ......... B05B 16/80; B05B 16/40; B05B 16/60; B05B 14/43; B05B 14/40; F24F 7/065; B60P 3/00; E04H 15/44; E04H 15/14
USPC .............................................. 454/49–55, 63
See application file for complete search history.

(56) References Cited

U.S. PATENT DOCUMENTS

| | | | | |
|---|---|---|---|---|
| 5,853,215 A | * | 12/1998 | Lowery ..................... | B60P 3/14 296/24.32 |
| 6,402,613 B1 | * | 6/2002 | Teagle .................. | F04D 19/002 454/195 |

(Continued)

*Primary Examiner* — Steven S Anderson, II
*Assistant Examiner* — Phillip Decker
(74) *Attorney, Agent, or Firm* — Donald G. Flaynik

(57) ABSTRACT

A portable variable volume paint spray enclosure or booth includes a frame assembled from longitudinal members and detachable clamps. The clamps secure together adjacent ends of the longitudinal members. The paint spray enclosure further includes a flexible cover disposed upon the frame such that a relatively air tight enclosure having a predetermined configuration is formed. The assembled frame and flexible cover extends from grade level to a predetermined elevation to encase an object to be painted. The paint spray enclosure also includes an air flow input apparatus for allowing air flow into the enclosure, and an air extraction apparatus/air scrubber for removing air from the enclosure, such that air mixed with vaporized paint inside the enclosure is removed from the enclosure before the paint vapor and air combine to form an explosive mixture, thereby preventing an explosion and/or fire from occurring inside the enclosure, and preventing operators from being exposed to harmful fumes. The air scrubber removes the paint vapor from the air as the combination exits the enclosure, thereby allowing only "clean" air back into the atmosphere.

4 Claims, 38 Drawing Sheets

(51) Int. Cl.
*F24F 13/28* (2006.01)
*B05B 14/43* (2018.01)
*F24F 13/02* (2006.01)

(56) References Cited

U.S. PATENT DOCUMENTS

| | | | |
|---|---|---|---|
| 7,735,502 B1* | 6/2010 | Hotes | E04H 15/64 |
| | | | 135/91 |
| 2005/0166488 A1* | 8/2005 | Borgerding | B65G 69/008 |
| | | | 52/173.2 |
| 2009/0253360 A1* | 10/2009 | Tafoya | B05B 16/80 |
| | | | 454/50 |
| 2012/0210598 A1* | 8/2012 | Hastings | D06F 58/06 |
| | | | 34/572 |

* cited by examiner

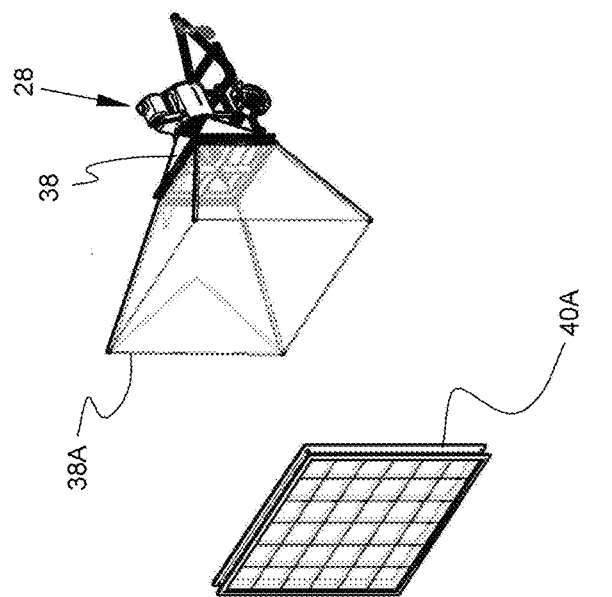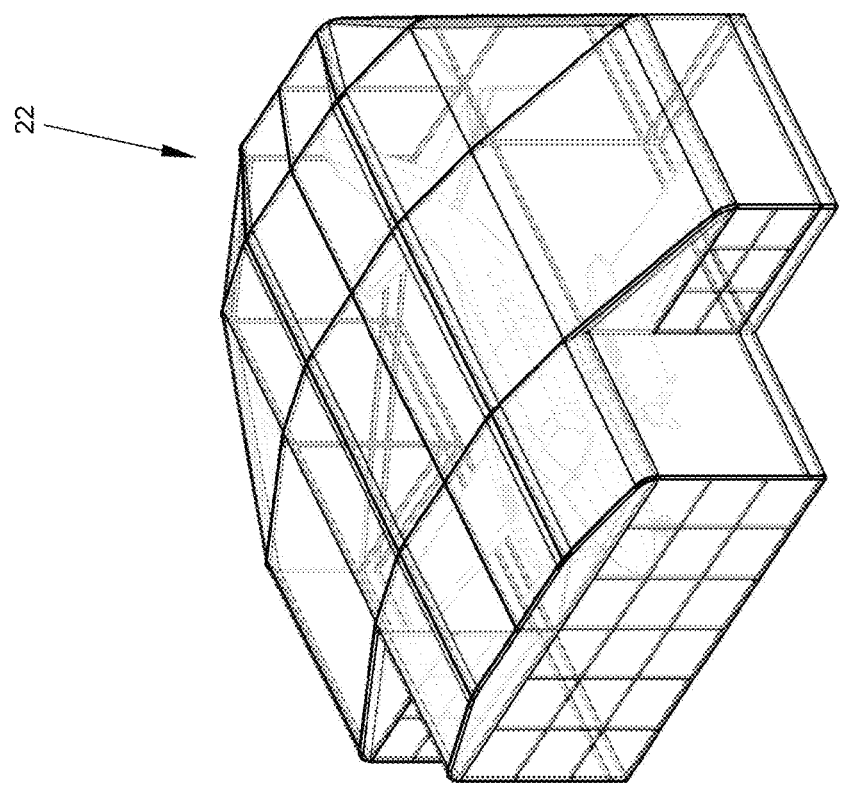
Fig. 5A

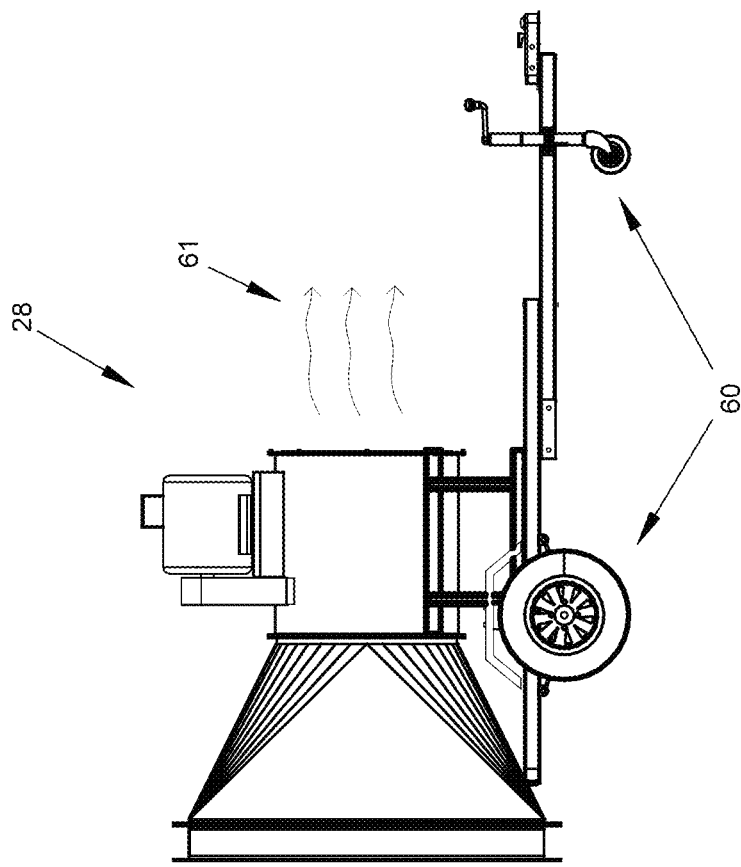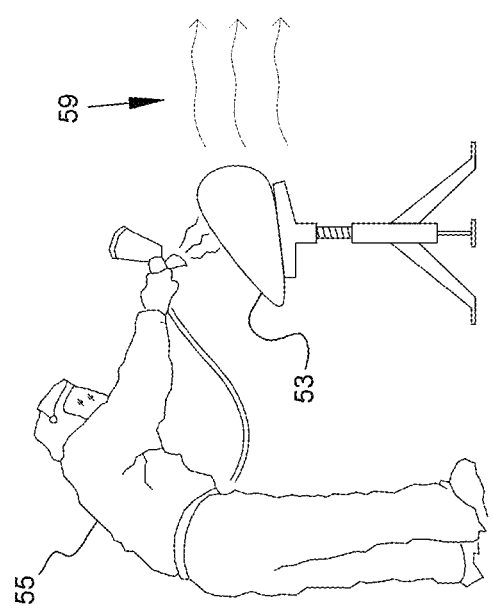
*Fig 9A*

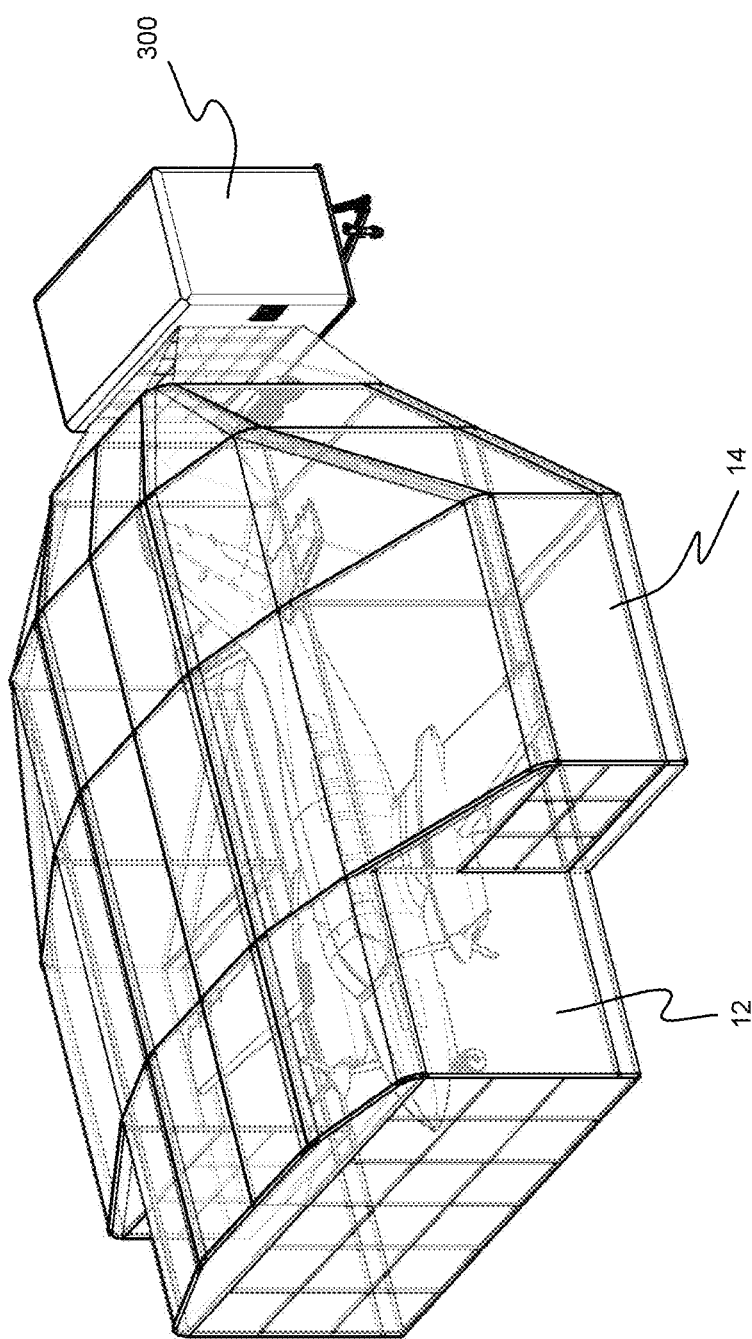

PORTABLE VARIABLE VOLUME PAINT SPRAY ENCLOSURE AND AIR SCRUBBER

This Utility application is based on Provisional Application No. 62/604,644 filed Jul. 13, 2017

BACKGROUND OF THE INVENTION

1. Field of the Invention

This invention relates to device and process for providing a portable variable volume paint spray enclosure or booth that includes an air circulation fan and/or an air scrubber for removing particles and flammable/explosive vapors generated during the painting of objects in a defined space.

2. Background of the Prior Art

Prior art portable spray painting enclosures and in particular, paint spray booths, with exhaust fans are available on the internet and through multiple manufacturers. These spray booths are available in a myriad of sizes and configurations. The problem with these prior art paint booth-fan exhaust devices and methods is that their dimensions and configurations are fixed and therefore have limited use for application requirements that include but not limited to relatively small planes, automobiles, boats, water towers, pipes and other irregularly configured and dimensioned objects.

Further, prior art portable spray painting booths do not include air scrubber exhaust devices for removing particulate matter, paint vapors and other flammable and/or explosive gases that can cause injury and death to users of spray paint enclosures. Devices are required that provide a method for constructing a spray painting enclosure that can encase and conform to the configuration of any object requiring painting, such that air flows urged through the enclosure engage all portions of the object being painted, thereby removing dangerous particulate matter and vapors from the enclosure and directing the matter and gases though an air scrubber filtering system that returns relatively clean air to the atmosphere.

SUMMARY OF THE INVENTION

It is a principal object of the present invention to provide a portable, variable volume paint spray device and method that prevents internal explosions and that removes particulate matter and paint vapors from air exiting an enclosure where the painting occurs. A feature of the device and method is an enclosure that can be configured and dimensioned to conform to the periphery of any object requiring painting. Another feature of the device and method is that the enclosure can be re-used for painting another object having different configurations and dimensions than the previously painted object. Still another feature of the device and method is that the enclosure is secured to an air circulation device that includes "air scrubbing" capability. An advantage of the device and method is that a minimum number of members need be purchased for constructing an enclosure to paint a predetermined object. Another advantage of the device and method is that all purchased members can be reused for configuring and dimensioning another object to paint. Still another advantage of the device and method is that the air scrubber can be used for another enclosure if the original air scrubber can provide sufficient air flow throughout the reconfigured enclosure.

Another object of the present invention is to provide an air scrubber device that includes only filter and fan assemblies. A feature of the device and method is an air scrubber having an air filter attached to an enclosure and a fan assembly with the fan assembly secured to a trailer that can be hitched to a vehicle. Another feature of the device and method is that the air filter and fan assembly can be disposed adjacent to a painting worksite without an enclosure being used when a relatively small object is being painted. An advantage of the device and method is that time and money is saved by not having to construct and enclosure. Another advantage is that safety and health conditions are maintained for ambient air exposed to paint fumes and particulate matter.

Still another object of the present invention is to provide an air scrubber device that includes a tractor trailer truck having multiple fans connected to one side of the trailer, a plurality of air filters connected to an opposite side of the trailer, and an enclosure for painting predetermined objects connected to an opposite side of the plurality of filters. A feature of the air scrubber device is that as many trailers as necessary to maintain air flow through the enclosure can be provided. An advantage of the air scrubber device is that the multiple fans connected to the one side of the trailer can be hauled inside the trailer to a worksite where the painting occurs, thereby saving time and money, and providing a safe work environment in a minimal amount of time.

Yet another object of the present invention is to provide an air scrubber device that includes an enclosed hauling truck for painting a myriad of objects including cars and smaller objects. A feature of the device is a paint room that receives air circulation urged through a plurality of air filters forming one side of a paint room in the truck, the air circulation being directed into and out of the truck via one or more fans secured inside the paint room or secured inside an adjacent utility room also inside the truck. An advantage of the air scrubber device is that the fans and filters are hauled by the truck with the truck acting as the painting enclosure via the paint room, thereby providing mobility and safety for painting a preselected object and eliminating the temporary construction of an enclosure, resulting in time and money being saved when driving a truck acting as both a paint booth and air scrubber to distant work sites.

BRIEF DESCRIPTION OF THE DRAWINGS

Objects, advantages and novel features of the present invention, as well as details of an illustrative embodiment thereof, will be understood from the following detailed description and attached drawings, wherein:

FIG. 5A is an exploded view of FIG. 5, but with a second bank of air filters added and the air discharge tube removed.

FIG. 9A is a perspective and side view of the air extraction fan of FIG. 1, but with the fan assembly acting as an air scrubber for the particles and fumes generated by a painter.

FIG. 42 is a perspective view of the airplane and enclosure of FIG. 1 coupled to the trailer paint spray booth/air scrubber of FIGS. 35-41 in accordance with the present invention.

DESCRIPTION OF THE PREFERRED EMBODIMENT

Figure 1:
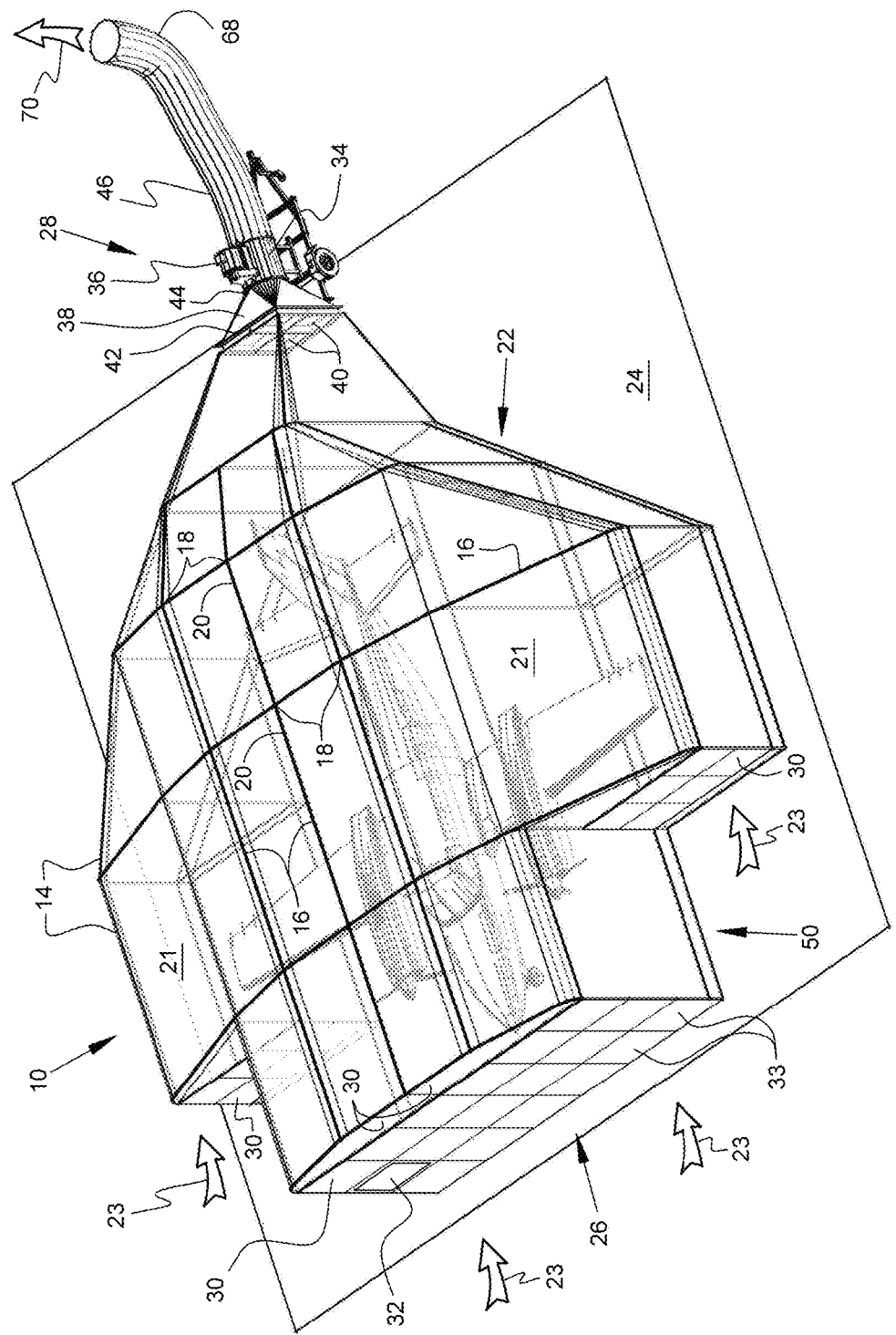
FIG. 1 is a left front perspective view of a portable variable volume paint spray booth with an airplane therein, and an air extraction fan providing air flow into the spray booth in accordance with the present invention.

Referring now to the drawings, and in particular to FIGS. 1-6, a portable variable volume paint spray booth for objects of any size or configuration in accordance with the present invention is denoted as numeral 10 with an airplane 12 (not included in the present invention) included therein for illustrative purposes. The paint spray booth 10 includes a frame 14 assembled from longitudinal members 16 having a predetermined length and detachable clamps 18. The clamps 18 (well known to those of ordinary skill in the art) secure together adjacent ends 20 of the longitudinal members 16. A flexible cover 21 is disposed upon the frame 14 such that a relatively air tight enclosure 22 is provided. The enclosure 22 includes a predetermined configuration that extends from grade level 24 to a predetermined elevation that encases an object, including an airplane 12 to be painted. The assembled frame 14 and the flexible cover 21 that form the enclosure 22 includes a configuration with dimensions corresponding to the configuration and dimensions of the object or airplane 12 to be painted inside the enclosure 22.

The paint spray booth 10 further includes an airflow input apparatus 26 for allowing air flow (represented by arrows 23) into the enclosure 22, and an air extraction apparatus 28 for removing air from the enclosure 22, whereby air mixed with vaporized paint inside the enclosure 22 is removed from the enclosure 22 before a paint vapor and air mixture rises above a predetermined low level explosion setpoint corresponding to the paint vapor and air mixture, thereby preventing an explosion and/or fire from occurring inside the enclosure 22, and preventing an operator working inside the enclosure 22 from being exposed to harmful fumes and dust when painting an object or the airplane 12.

The enclosure 22 of the portable variable volume paint spray enclosure 10 includes a volume substantially about twenty percent greater than the volume of the airplane 12 being painted inside the enclosure, thereby optimizing air flow for paint vapor removal from the enclosure 22. The longitudinal members 16 of the enclosure 22 include tubing, pipe, rods, conduits, angle iron, channels and combinations thereof having longitudinal dimensions substantially about ten feet and lateral dimensions substantially about two inches. The flexible cover 21 of the enclosure 22 includes polyethylene plastic such as visqueen, and/or plastic sheets, and/or flame retardant shrink wrap, and/or combinations thereof. The air input apparatus 26 includes apertures 30 having air inlet filters 32 (substantially about twenty inches square and well known to those of ordinary skill in the art) that cover the apertures 30 to form a relatively large input filter array 33 to provide a relatively large quantity of airflow 23 at atmospheric pressure into the enclosure 22, resulting in a relatively large quantity of airflow at vacuum pressure flowing through the enclosure 22 until the airflow is forcibly removed from the enclosure 22 via the air extraction apparatus 28.

Figure 10:
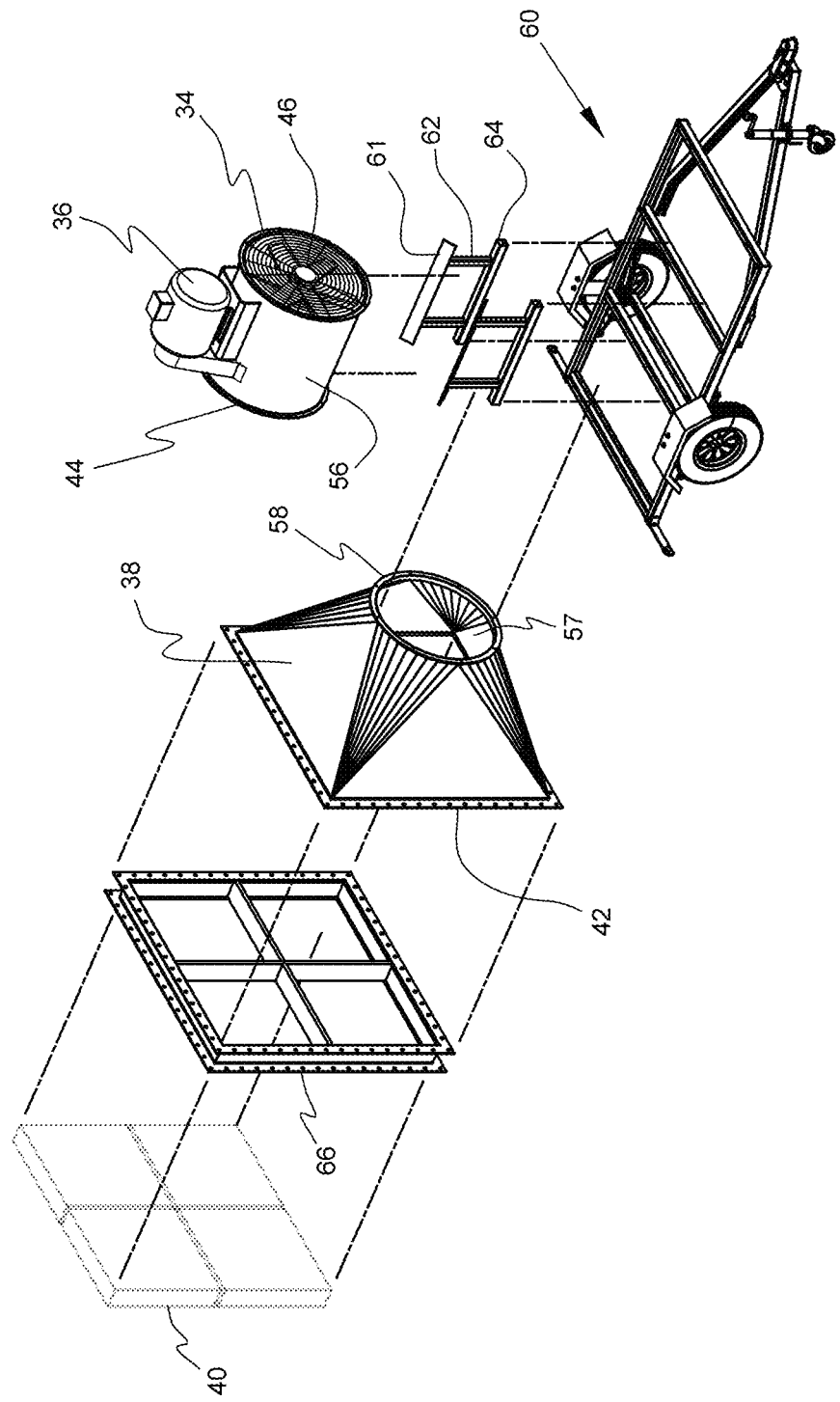
FIG. 10 is an exploded view of the fan of FIG. 9.
Figure 10A:
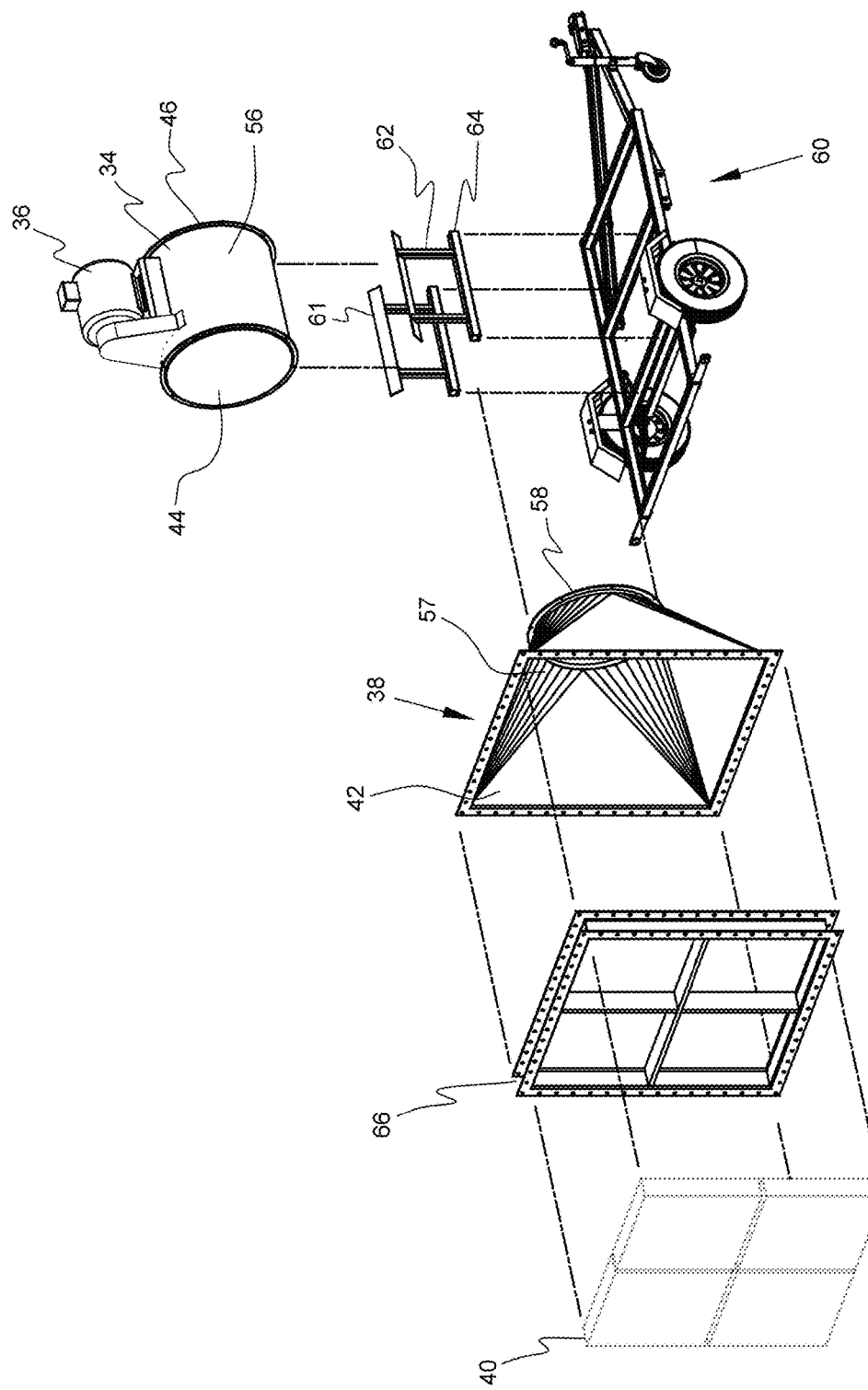
FIG. 10A is an opposite end perspective view of FIG. 10.
Figure 11:
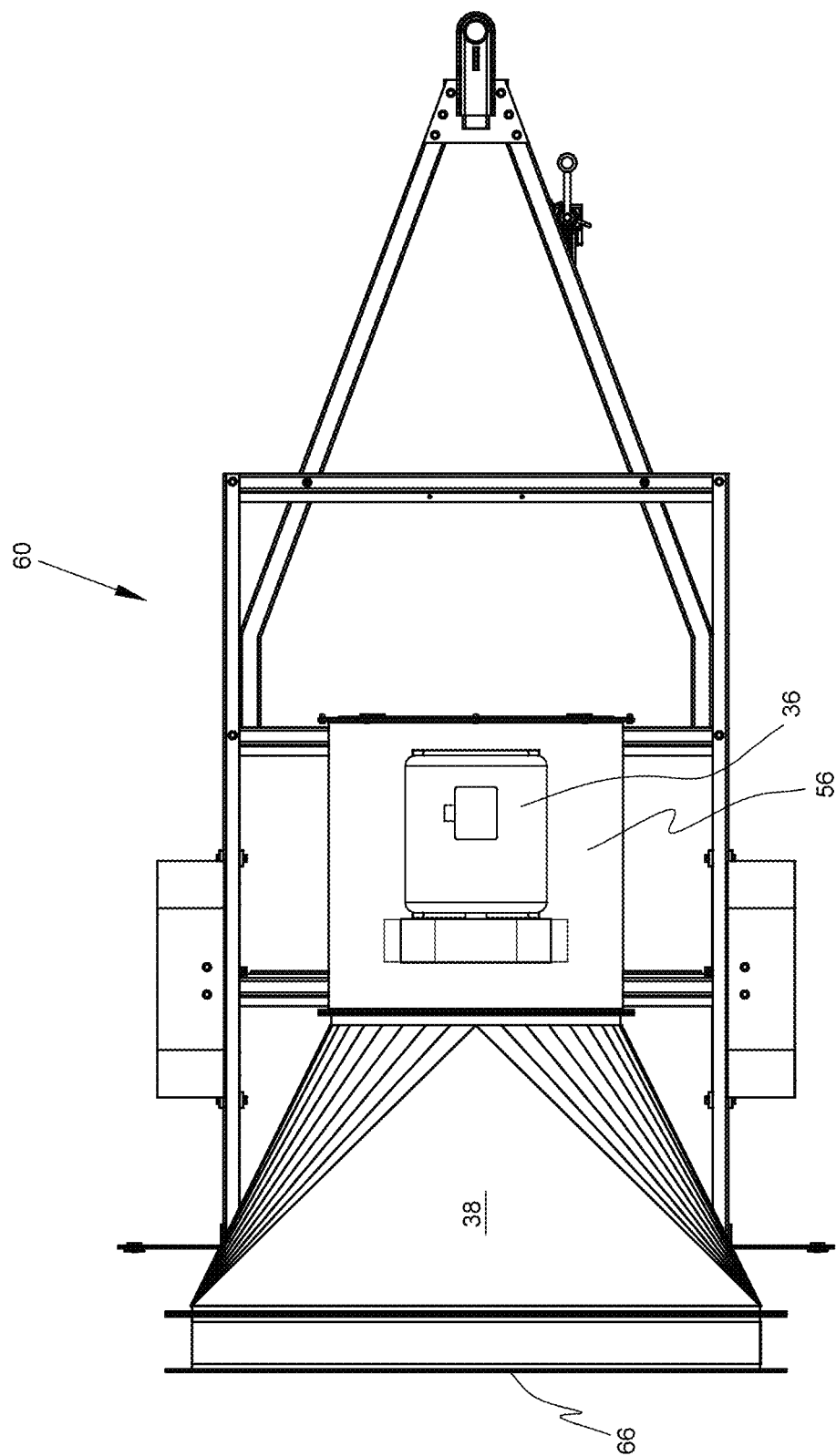
FIG. 11 is a top view of the air extraction fan of FIG. 9.
Figure 12:
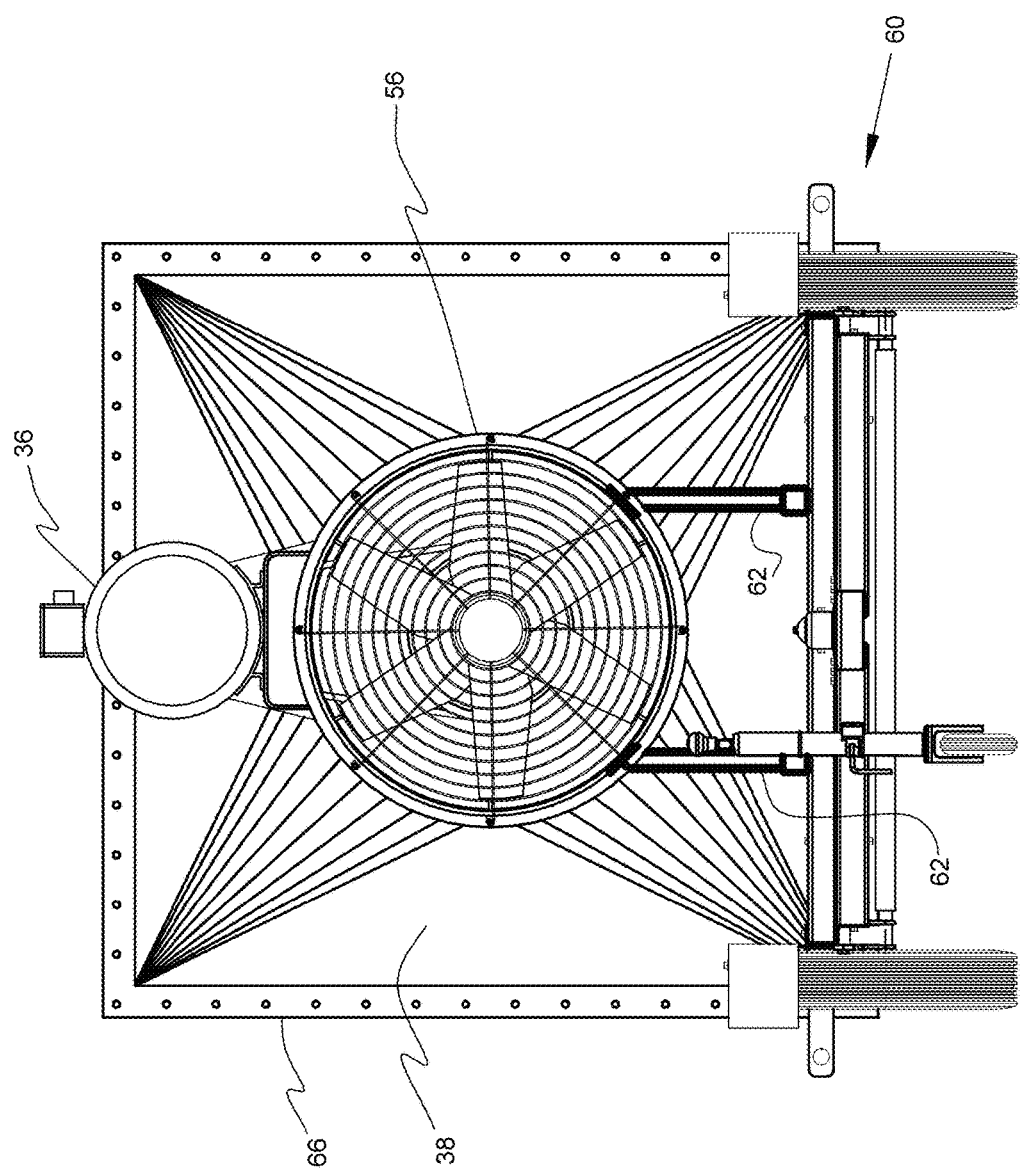
FIG. 12 is a front elevation view of the air extraction fan of FIG. 9.

The air extraction apparatus 28 includes a fan 34 driven by an electric motor 36 that cooperate to remove air from the enclosure 22 such that a negative pressure is present inside the enclosure 22. The motor 36 is secured to a top portion of the fan 34, and the fan 34 is secured to a trailer 60 (see page 4, lines 6-17, and FIG. 10) to enable the fan-motor assembly to be driven to a site selected for assembling the spray booth 10, or any worksite requiring a fan-motor assembly to provide airflow pursuant to the worksite's specifications, which can include but not limited to dust removal from construction sites, harmful and/or explosive vapor removal from fabrication shops, and urging fresh air into mines and/or enclosures to supply workers therein.

Figure 2:
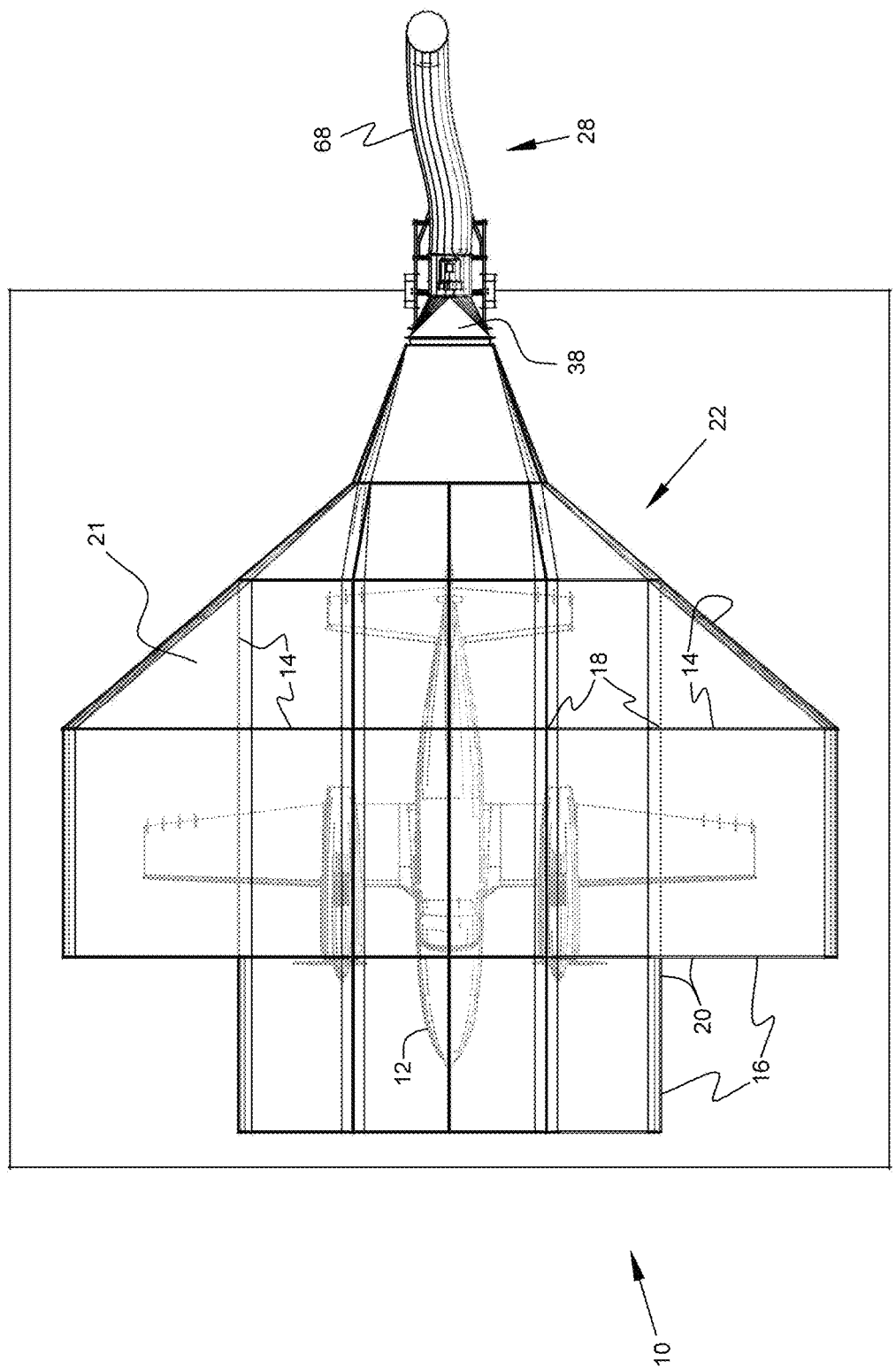
FIG. 2 is a top elevation view of the spray booth of FIG. 1.
Figure 3:
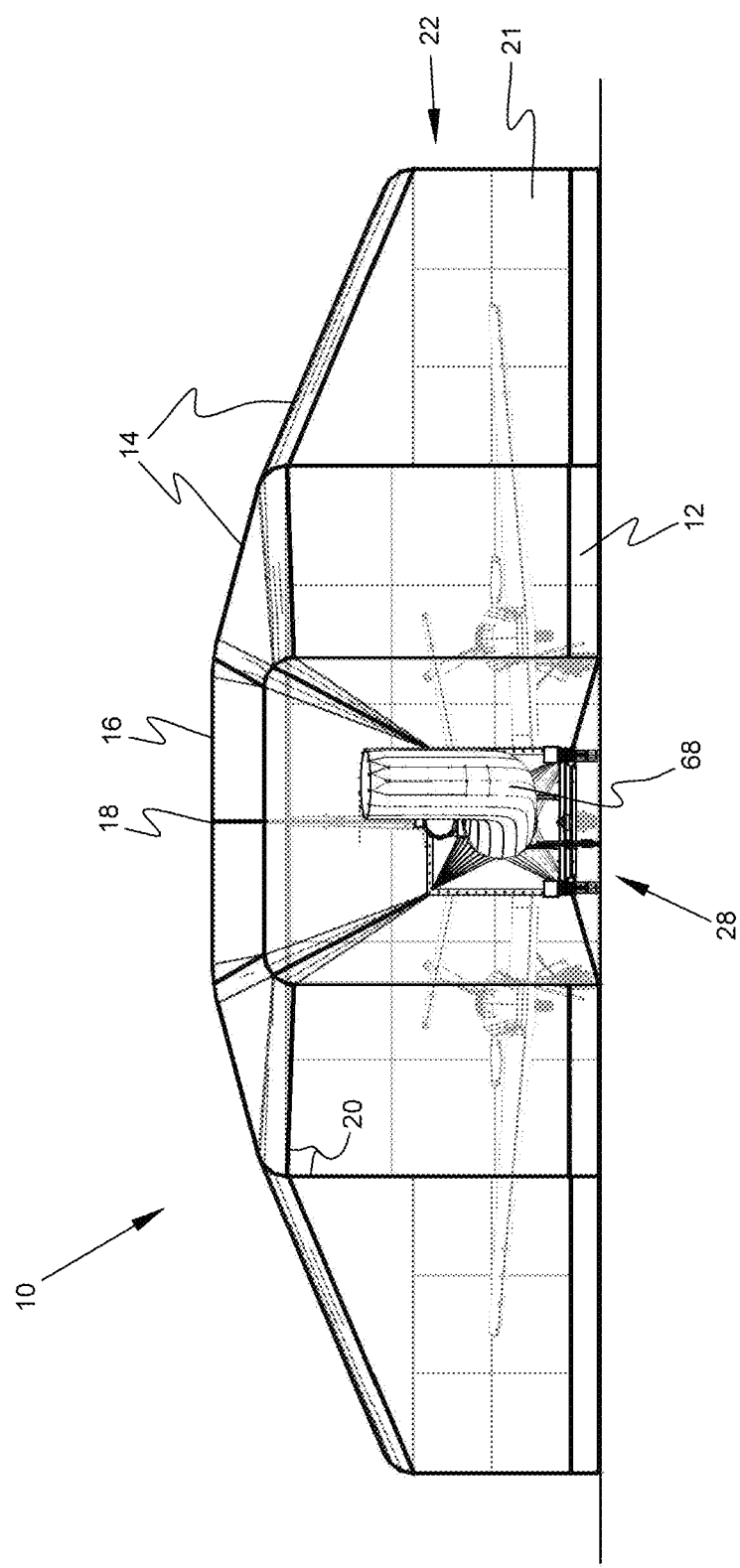
FIG. 3 is back elevation view of the spray booth of FIG. 1.

The air removed from the enclosure 22 is urged through exhaust filters 40 (well known to those of ordinary skill in the art, which includes air scrubbers) secured to an enlarged air receiving end 42 of a funnel chamber 38 secured to a suction end 44 of the fan 34. The air exhaust filters 40 remove paint particles and other particulate matter that would otherwise escape from the enclosure 22 and create health problems for the public. The exhaust filters 40 are disposed proximate to an air discharge end 46 of the fan 34. The motorized fan 34 extracts air from the enclosure 22 at a rate substantially about one hundred cubic feet per minute, resulting in a relatively small vacuum or negative air pressure inside the enclosure 22, the negative air pressure corresponding to dirt or particle buildup upon the filters 40. FIGS. 1-3 depict an air discharge tube 68 attached to the air exhaust or discharge end 46 of the fan 34 such that exhaust air 70 from the enclosure 22 is elevated to a predetermined elevation above grade level 24 to prevent paint vapors and dust exiting the enclosure 22 from engaging pedestrians proximate to the discharge end 46 of the fan 34.

Figure 5:
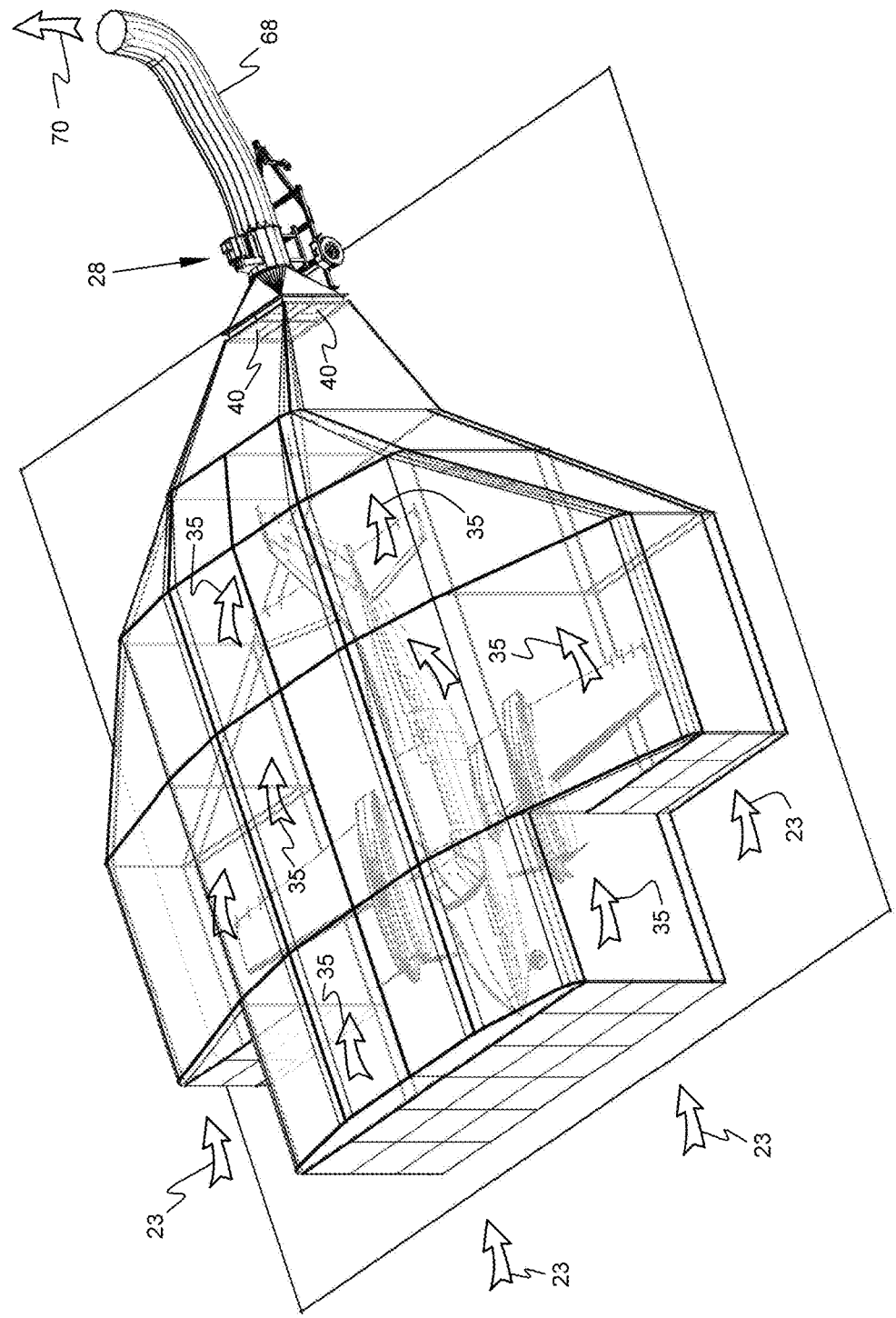
FIG. 5 is the front perspective view of FIG. 1, but with added air flow within the spray booth.
Figure 9:
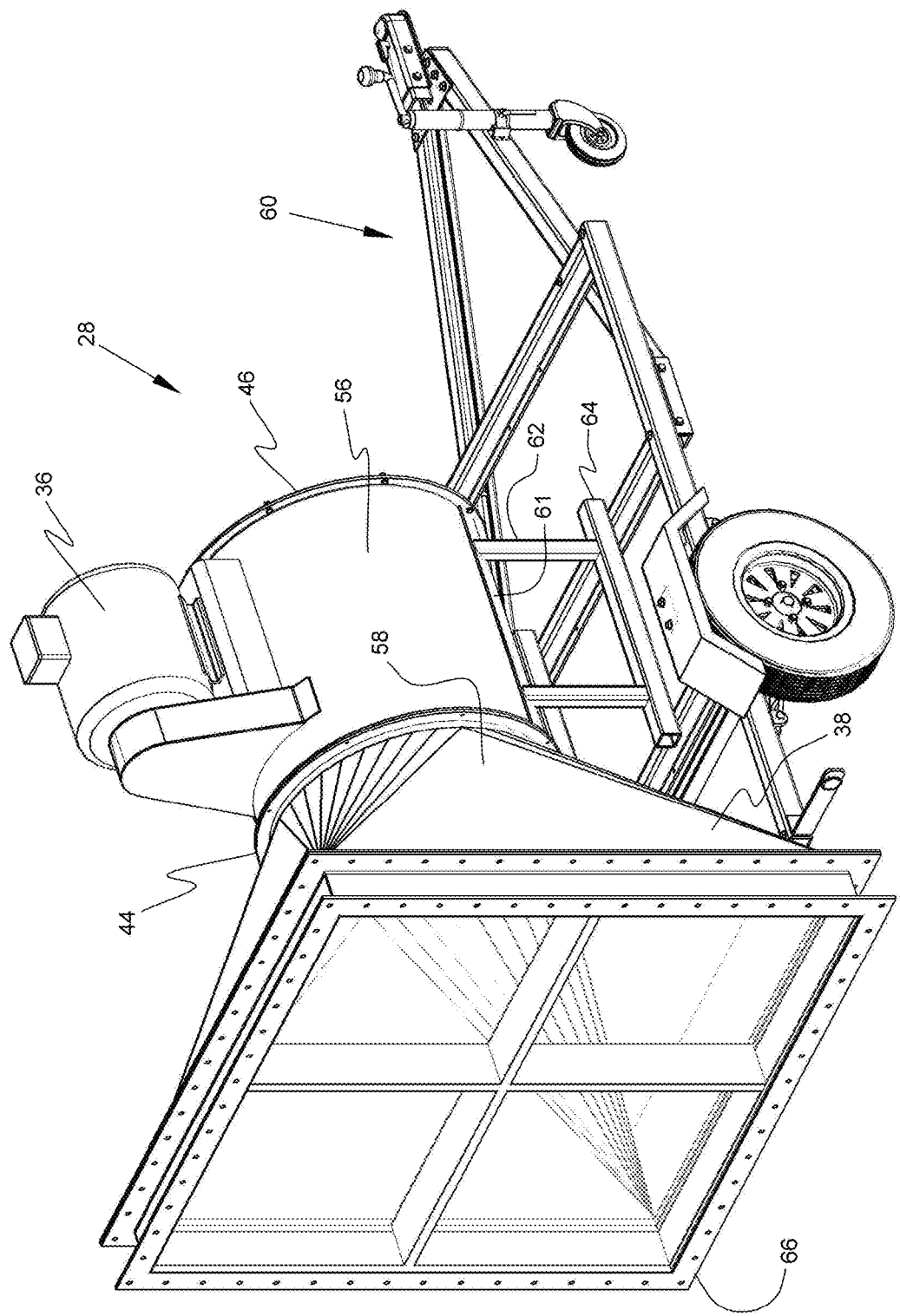
FIG. 9 is a perspective view of the air extraction fan of FIG. 1.

FIG. 5A is an exploded view of FIG. 5 and depicts a second bank of exhaust filters 40A secured between the enclosure 22 and a second funnel chamber 38A to be used when relatively high levels of paint fumes are generated inside the enclosure 22. FIG. 6A is left side perspective view of FIG. 6 but with the second bank of exhaust filters 40A and second funnel chamber 38A of FIG. 5A included. The combination of the exhaust filters 40 and fan 34 (see FIG. 9A), result in an air extraction apparatus 28 that acts as an air scrubber 28 for removing particles and paint fumes 59 generated by a user 55 painting an object 53. The exhaust air 61 from the air scrubber 28 is ultimately returned to the atmosphere. The resulting transportable air scrubber 28 can be used independently of the enclosure 22 for removing particulates and paint fumes generated by project sites at distant locations from a storage location of the air scrubber 28. The air scrubber 28 is transported to project sites via a trailer portion 60, and if required, an air discharge tube 68 can be separated from the air scrubber 28 and hauled with the air scrubber 28 to a project site.

Figure 4:
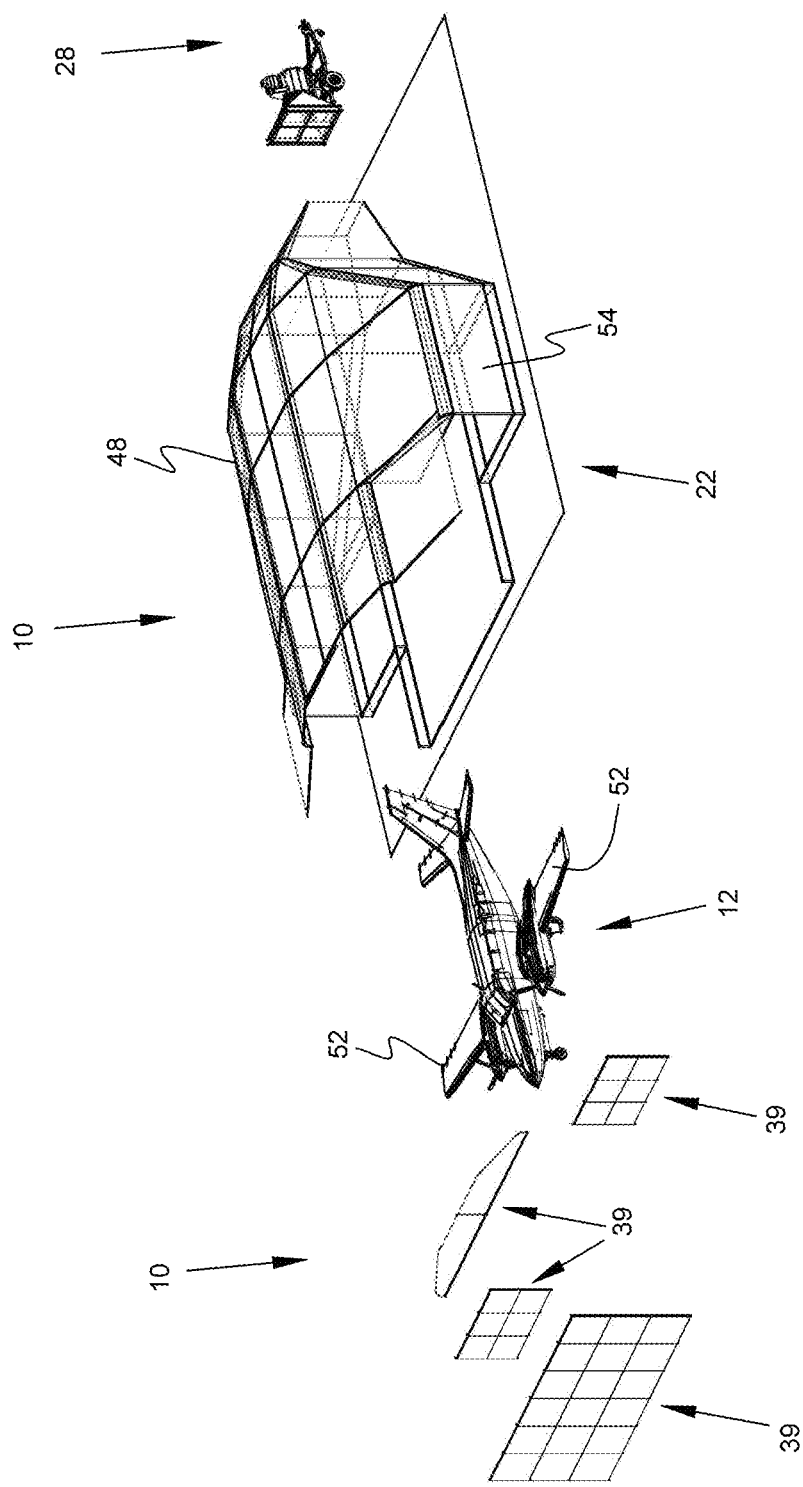
FIG. 4 is an exploded view of the spray booth of FIG. 1.

Referring to FIG. 4, an exploded view of the portable variable volume paint spray booth 10 is depicted with the enclosure having a back portion 48 illustrated and a front portion 50 (see FIG. 1) removed. The configuration and dimensions of the back portion 48 with the front portion 50 removed allows the airplane 12 to be disposed inside the back portion 48 such that the wings 52 of the plane 12 are within a laterally enlarged mid-portion 54 of the enclosure 22. The front portion 50 is ultimately constructed and joined to the back portion 48, thereby completing the enclosure about the airplane 12. Alternatively, only the frame 14 of the back portion 48 is constructed to allow the airplane 12 to be disposed inside the back portion 48 such that the wings 52 are under the mid-portion 54 of the frame 14, whereupon, the front portion 50 of the frame 14 is constructed and secured to the back portion 48 followed with the cover 21 disposed upon the completed frame 14 to construct the enclosure 22 about the airplane 12. After the airplane 12 is painted, the cover 21 is removed followed by the detachment of the front portion 50 from the back portion 48, whereupon, the plane 12 is removed from the back portion 48 followed with the disassembly of the back portion 48.

The air inlet filters 32 that are secured in the apertures 30 of FIG. 1 can be replaced by relatively larger air inlet filters 39 that fit upon corresponding groups of apertures 30 depicted in FIG. 1. Referring to FIG. 5, the airflow into the enclosure 22, represented by arrows 23, circulates about the airplane 12 and through the enclosure 22 as represented by arrows 35 and ultimately mixes with paint vapors and dust (not depicted) and becomes "dirty air"; whereupon, the dirty air is extracted from the enclosure 22 and through the air exhaust filters 40 via the air extraction apparatus 28 and is discharged to the atmosphere as "cleaned air" 70.

Figure 6:
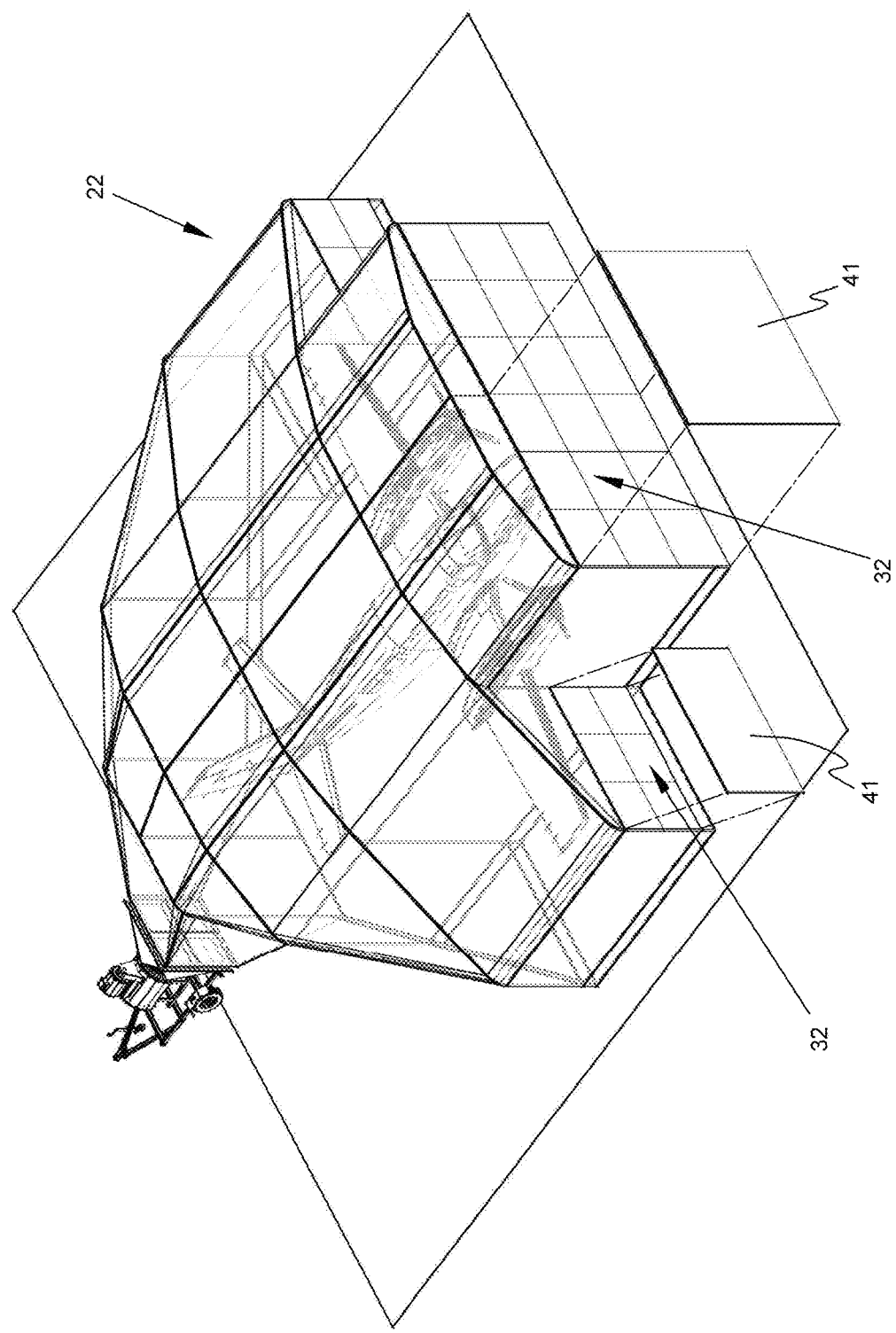
FIG. 6 is a right perspective view of FIG. 1, but with air blocking covers added.
Figure 6A:
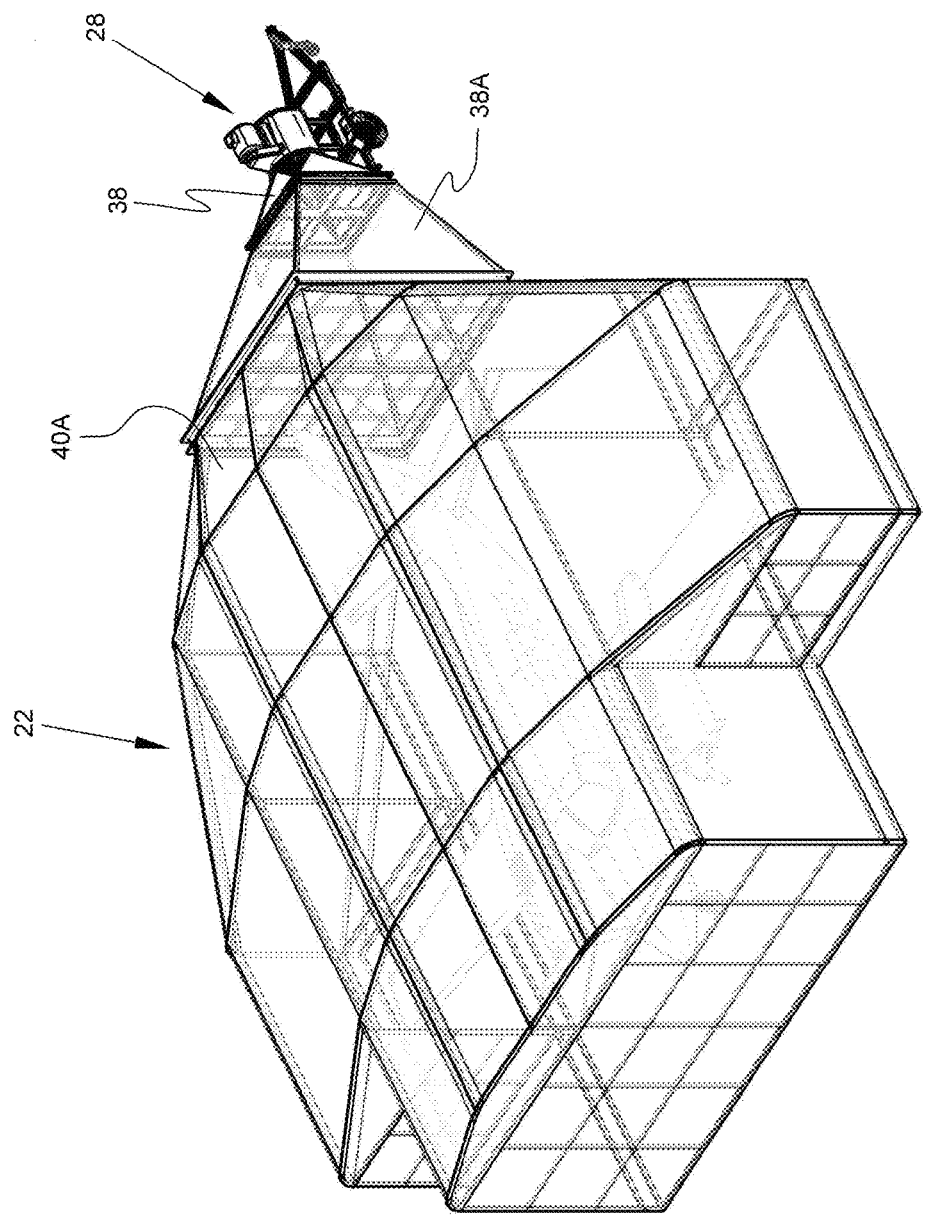
FIG. 6A is a left side perspective view of FIG. 6, but with the second bank of exhaust filters and second funnel chamber of FIG. 5A included.
Figure 7:
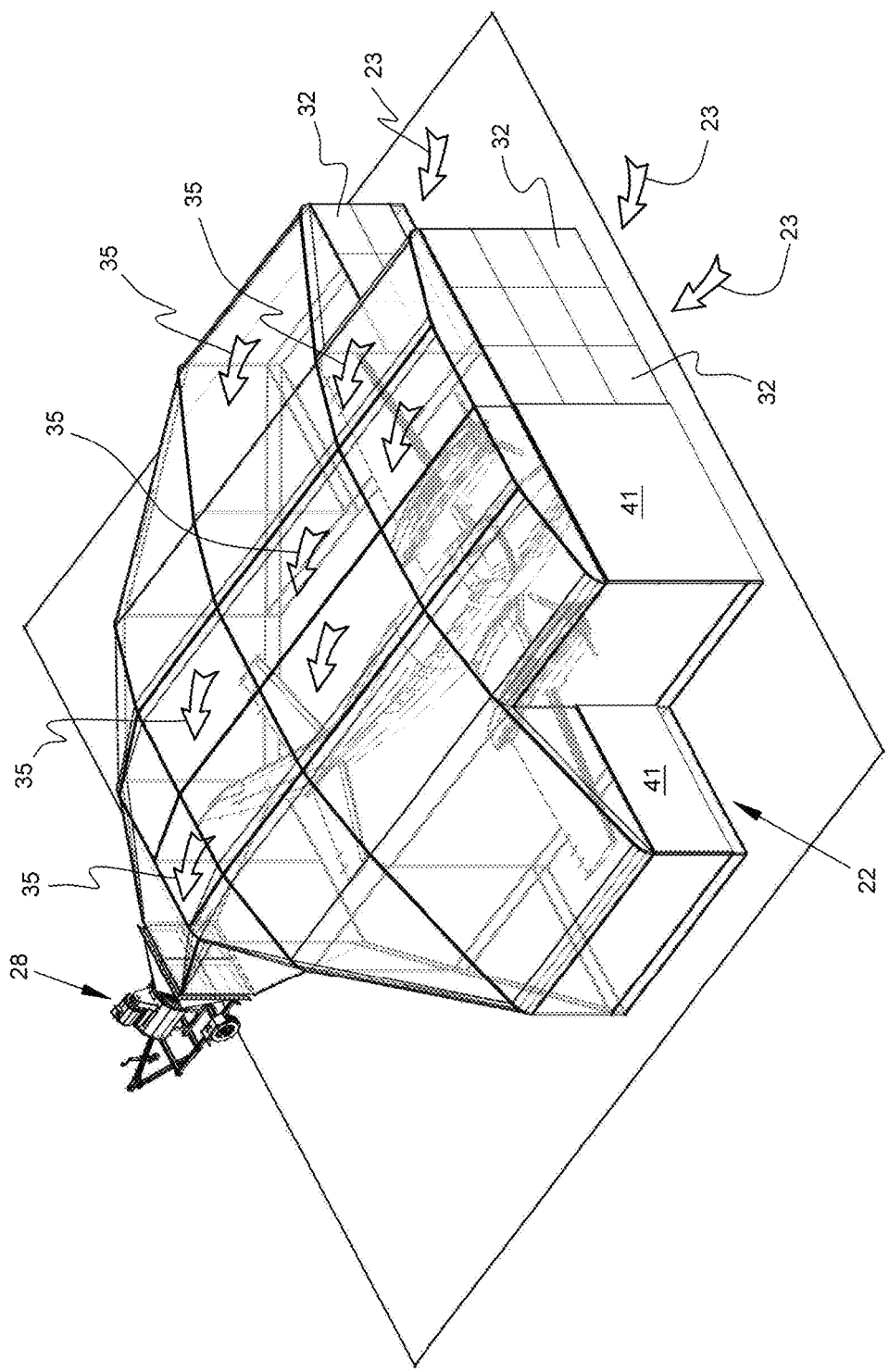
FIG. 7 is the right perspective view of FIG. 6 depicting air flow into and through the spray booth with air blocking covers added.

Referring to FIGS. 6 and 7, the enclosure 22 of FIG. 1 is depicted, but with air blocking covers 41 disposed proximate to corresponding portions of air inlet filters 32 selected to be covered, thereby preventing airflow from entering the enclosure 22 via the covered portions 41, resulting in airflow 35 through substantially a half of the enclosure 22 that corresponds to a half portion of the airplane 12 selected for painting. To maintain airflow 35 in a selected half portion of the enclosure 22, a "curtain" (not depicted) is installed inside the enclosure 22 such that the half portion of the airplane 12 selected for painting is substantially isolated from the half portion of the airplane 12 to prevent the isolated half portion from receiving any paint.

Figure 8:
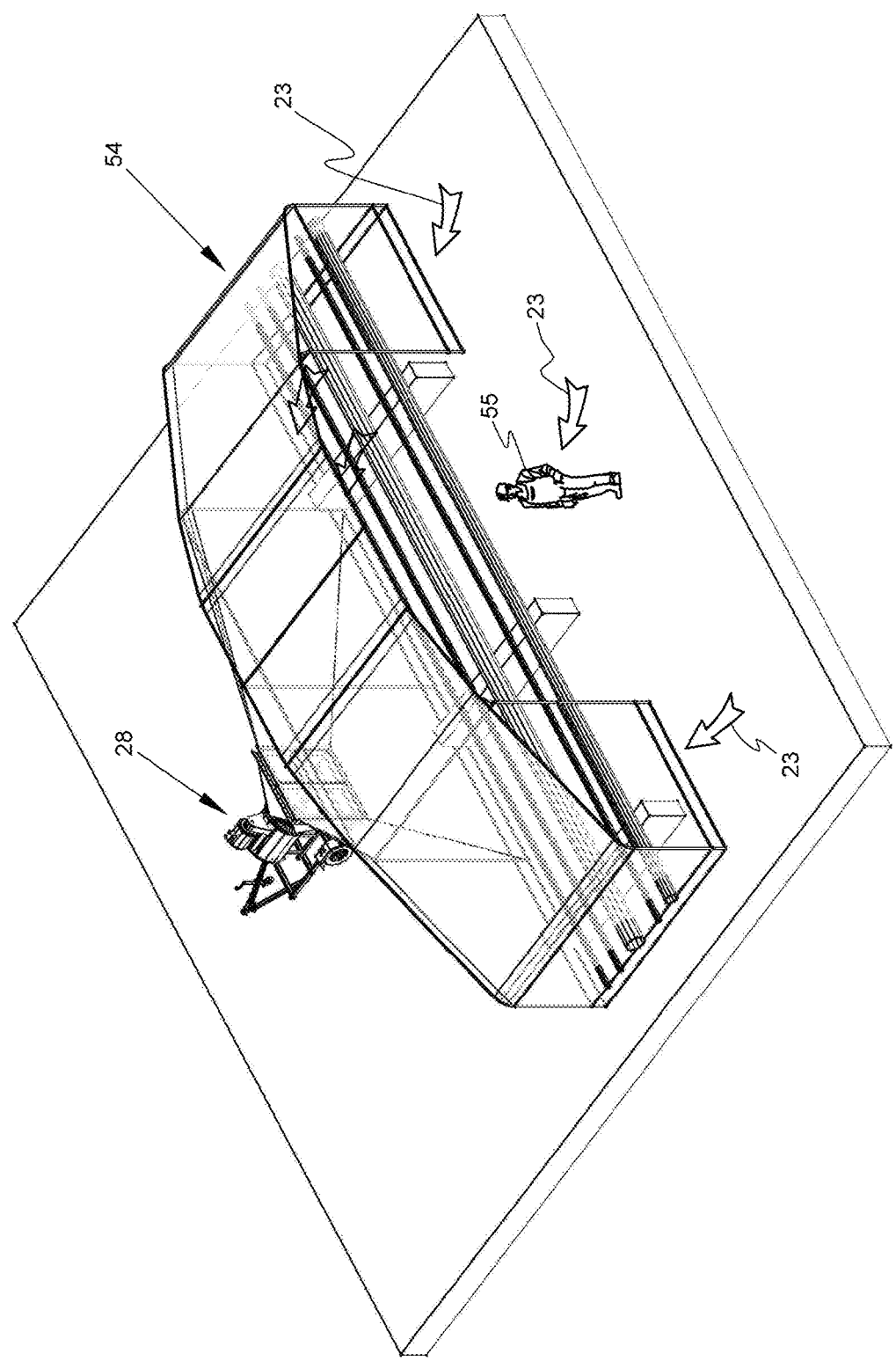
FIG. 8 is a right perspective view of a mid-portion of FIG. 6 providing a reduced volume spray booth for painting objects smaller than an airplane.

Referring to FIG. 8, the enlarged mid-portion 54 of the enclosure 22 of FIG. 4 is depicted separately from the back and front portions 48 and 50 of the enclosure 22 to illustrate the variable configurations that the spray booth 10 can assume. In FIG. 7, the mid-portion 54 is sized and configured to allow an individual 55 to paint objects smaller than an airplane 12, including but not limited to cars, trucks, motorcycles, furniture and other relatively small objects.

Referring to FIGS. 9-12, the fan 34 of the air extraction apparatus 28 includes a cylindrical plenum or shroud 56 having a relatively smooth interior. The suction end 44 of the fan 34 is secured to a reduced end 58 of the funnel chamber 38, which also has a relatively smooth interior 57, thereby increasing the volume of air removed from the enclosure per second of time via a relatively small but high torque electric motor 36. The motor 36 is mounted on top of the shroud 56 out of the air stream of the fan 34, and the shroud 56 is mounted upon a mobile trailer 60 (see FIG. 10) via angled mounting members 61, and vertical and horizontal channels 62 and 64, thereby enabling the extraction apparatus 28 to be moved via a road vehicle to a predetermined site for painting an airplane 12 or any other object. The exhaust filters 40 are secured to the enlarged air receiving end 42 of the funnel chamber 38 via a filter frame or housing 66. The filter frame 66 is bolted to the enlarged air receiving end 42 and the exhaust filters 40 are secured to the filter frame 66 via bolts (not depicted) or similar securing members.

Referring to FIGS. 13-17, an alternative portable variable volume paint spray booth for painting any object 12, large or small, including airplanes, cars and trucks, is denoted as numeral 80. The alternative paint spray booth 80 includes an enclosure 82 having a substantially cubic configuration with a substantially square configured top wall 84 with a surface area relatively larger than the top surface areas of the airplane 12. The enclosure further includes substantially rectangular configured side walls 86 having a vertical elevation relatively higher than a top wall 88 of a truck trailer 90 disposed adjacent and longitudinally parallel to a front wall 92 of the enclosure 82. The front wall 92 includes an upper aperture 94 in an upper portion of the front wall 92, the upper aperture 94 providing ingress for outside atmospheric air 100 into the enclosure 82. The front wall 92 further includes a lower aperture 95 in a lower portion of the front wall 92, the lower aperture 95 providing egress for air at a vacuum pressure inside the enclosure 82. A canopy 96 extends at a downward angle from an edge 98 of the top wall 84 of the enclosure 82 until engaging the top wall 88 of the truck trailer 90. The canopy 96 prevents rain, snow or other objects from entering the enclosure 82 via the upper aperture 94.

The upper aperture 94 provides ingress for outside atmospheric air 100 urged into the enclosure 82 via motorized fans 102 disposed adjacent to the truck trailer 90 and connected to the truck trailer 90 via trailer connection tubes 108. The motorized fans 102 are secured to a lockable wheel base 105 for promoting movement of the fans 102 to an optimum position relative to the truck trailer 90. Upon entering the enclosure 82, the air 106 is directed about the enclosure 82 via the fans 102, whereupon, the air 106 mixes with paint vapors and the air-paint vapor mixture is then urged through the lower aperture 95 in the front wall 92 and through an array of filters 110 secured to an inner wall 112 of the truck trailer 90. The filters 110 are well know to those of ordinary skill in the art and cover an aperture 114 in the inner wall 112, thereby filtering the air-paint vapor mixture urged from the enclosure 82 by the fans 102 before the air-paint vapor mixture is urged into the trailer 90 and through air discharge tubes 108 connected to apertures in a trailer wall opposite the inner wall 112, resulting in filtered relatively "clean" exhaust air 116 being discharged to the atmosphere.

Figure 19:
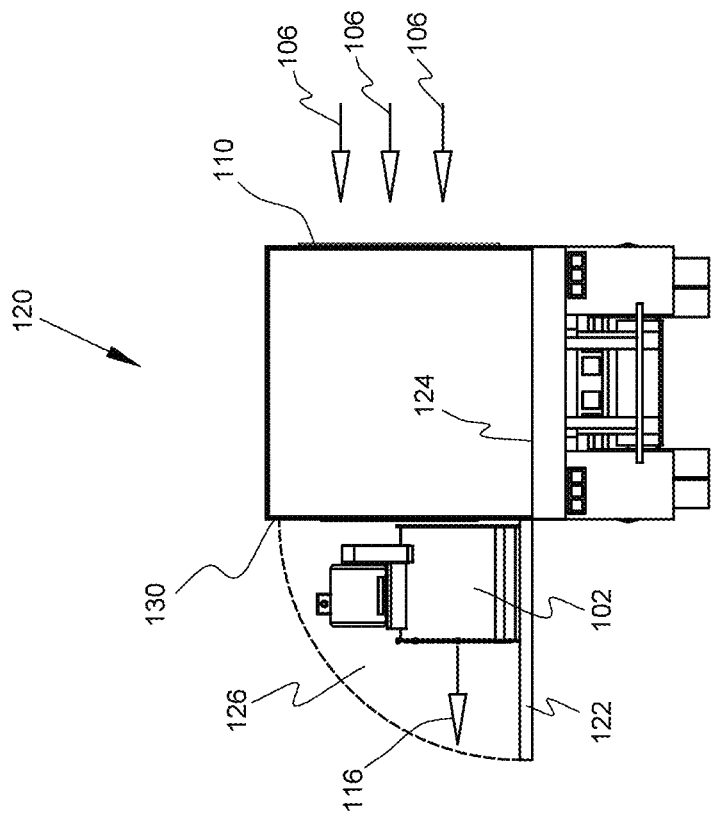
FIG. 19 is the back end elevation view of the trailer of FIG. 18, but with the fan-motor assembly slidably removed from the trailer when a side door of the trailer is opened.
Figure 18:
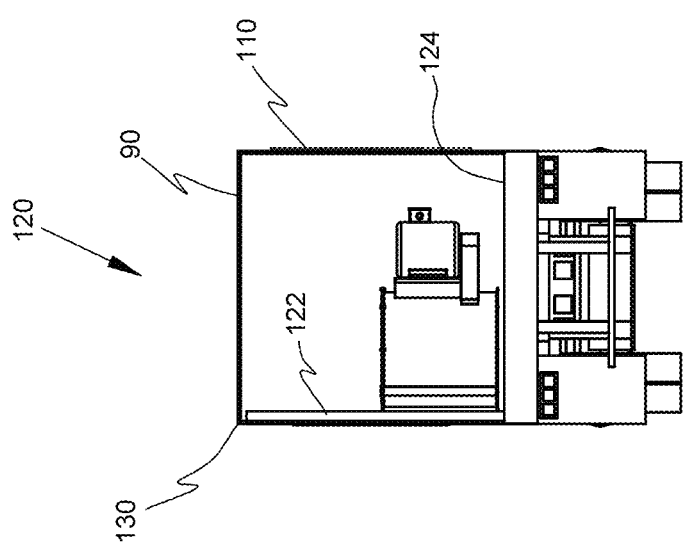
FIG. 18 a back end elevation view of the trailer of FIG. 16, but with the back doors removed and a fan-motor assembly depicted inside the trailer in accordance with the present invention.

Referring to FIGS. 18 and 19, a second alternative portable variable volume paint spray booth is denoted as numeral 120. The second alternative spray booth 120 is substantially the same as the first alternative spray booth 80 except that the motorized fans 102 are secured inside the trailer 90 upon a base plate 122 that is pivotally secured to the floor 124 of the trailer 90; such that when an outside door 126, pivotally secured via a hinge (not depicted) to a portion of an outer wall 130 of the trailer 90, is pivotally moved ninety degrees from a vertical to a horizontal position to expose an aperture (not depicted) in the outer wall 130, the base plate 122 (and fans 102 secured to the base plate 122) is disposed (via the aperture) outside the trailer 90 to enable the fans 102 to direct air 100 into and air 106 out of the enclosure 82, and through the filter 110 as described in the first alternative above. A seal fabricated from visqueen (not depicted) seals the fans 102 to the trailer 90 to optimize air circulation through the enclosure 82. The second alternative paint spray booth 120 is variable in that the quantity of fans 102 can be varied to control the corresponding airflow 106 into and airflow 116 out of the trailer 90.

Figure 20:
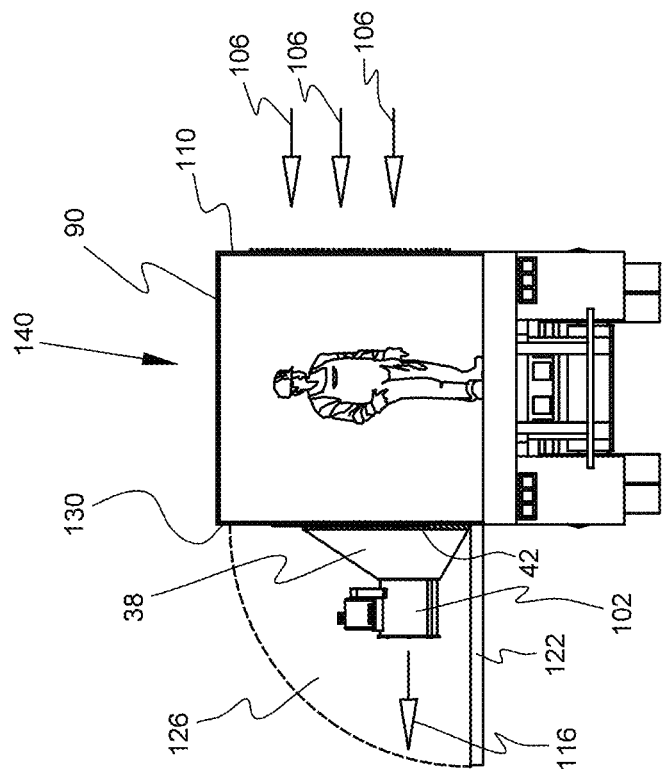
FIG. 20 is the back end elevation view of the trailer of FIG. 19, but with the trailer acting as the paint booth/air scrubber, thereby negating the variable paint booth structure of FIG. 13.

Referring to FIG. 20, a third alternative portable variable volume paint spray booth is denoted as numeral 140. The third alternative spray booth 140 is the same as the second alternative spray booth 120 except that the enclosure 82 has been removed and the internal compartment of the trailer 90 is used as a spray booth for painting relatively small objects compared to the relatively large airplane enclosures 22 and 82. Further, the third alternative spray booth 140 includes a funnel chamber 38 substantially similar to the funnel chamber 38 in FIG. 10 including the filter frame 66 and air exhaust filter 40 secured to the frame 66. The enlarged air receiving end 42 of the chamber 38 is sized to cover a corresponding aperture in the outer wall 130 of the trailer 90, resulting in the return of relatively "clean" air 116 to the atmosphere.

Figure 21:
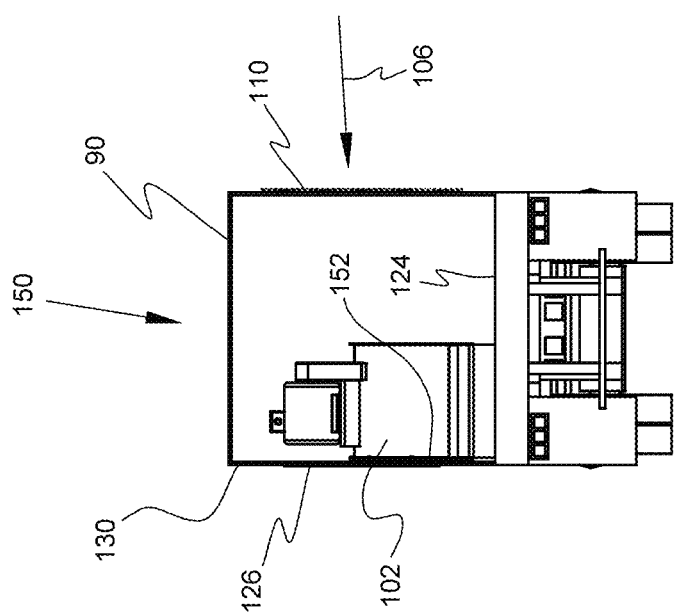
FIG. 21 is the back end elevation view of the trailer of FIG. 20, but with the fan-motor assembly secured to the bottom of the trailer.

Referring to FIG. 21, a fourth alternative portable variable volume paint spray booth is denoted as numeral 150. The fourth alternative spray booth 150 is the same as the third alternative spray booth 140 described above, except that the fourth alternative spray booth 150 includes fans 102 that are rigidly secured to the trailer floor 124, and except that the pivoting outside door 126 is used only to expose the aperture in the outer wall 130 of the trailer 90. An air discharge end 152 of the fans 102 includes air filters (not depicted) sized to cover the aperture in the outer wall 130 of the trailer 90, thereby allowing only clean air to be discharged to the atmosphere after ambient air 106 is drawn into the trailer 90 via filters 110 and mixed with paint vapors inside the trailer 90.

Figure 13:
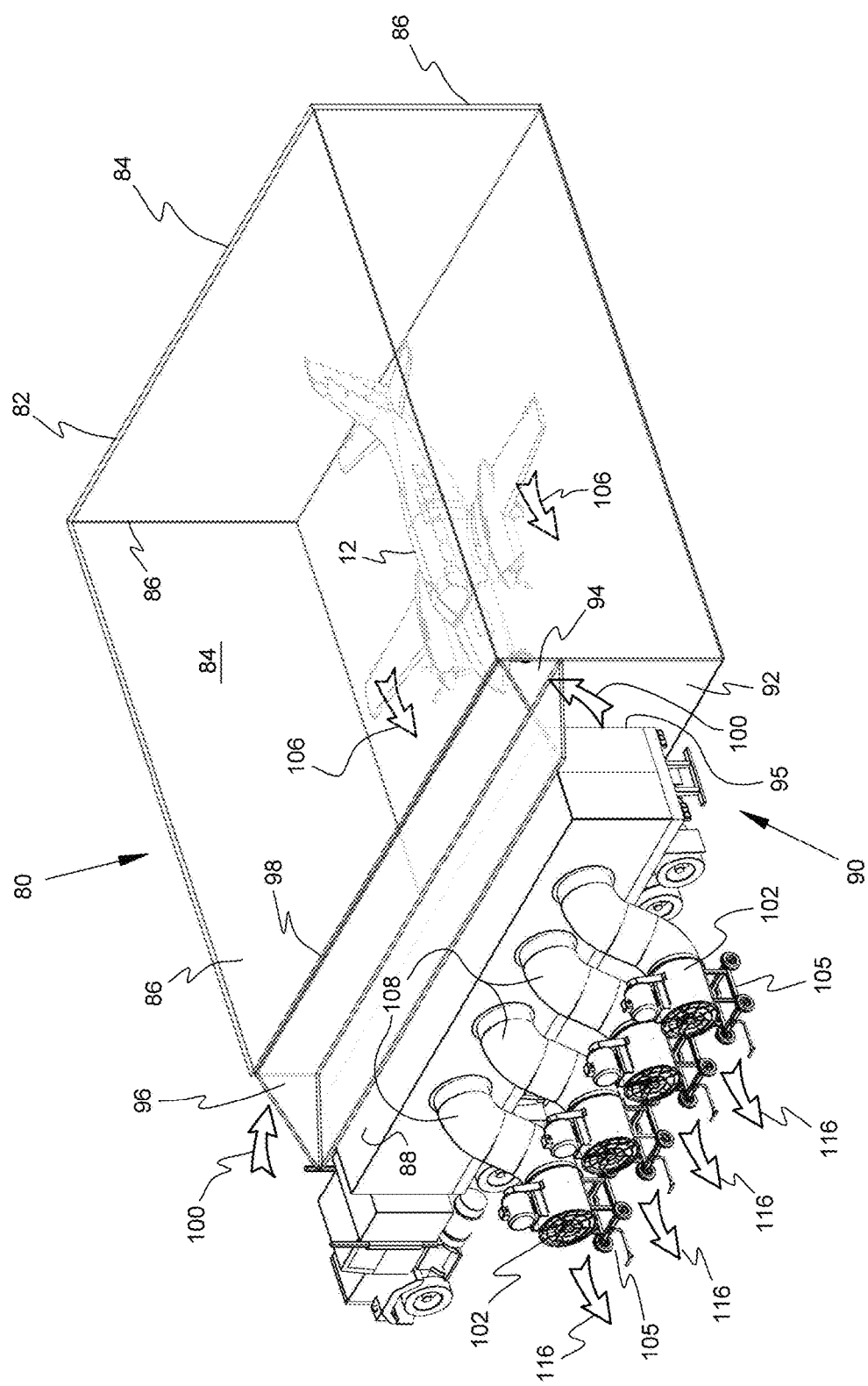
FIG. 13 is a front perspective view of an alternative portable variable volume paint spray booth/air scrubber that includes portable flans removably secured to a trailer pulled by a truck in accordance with the present invention.
Figure 14:
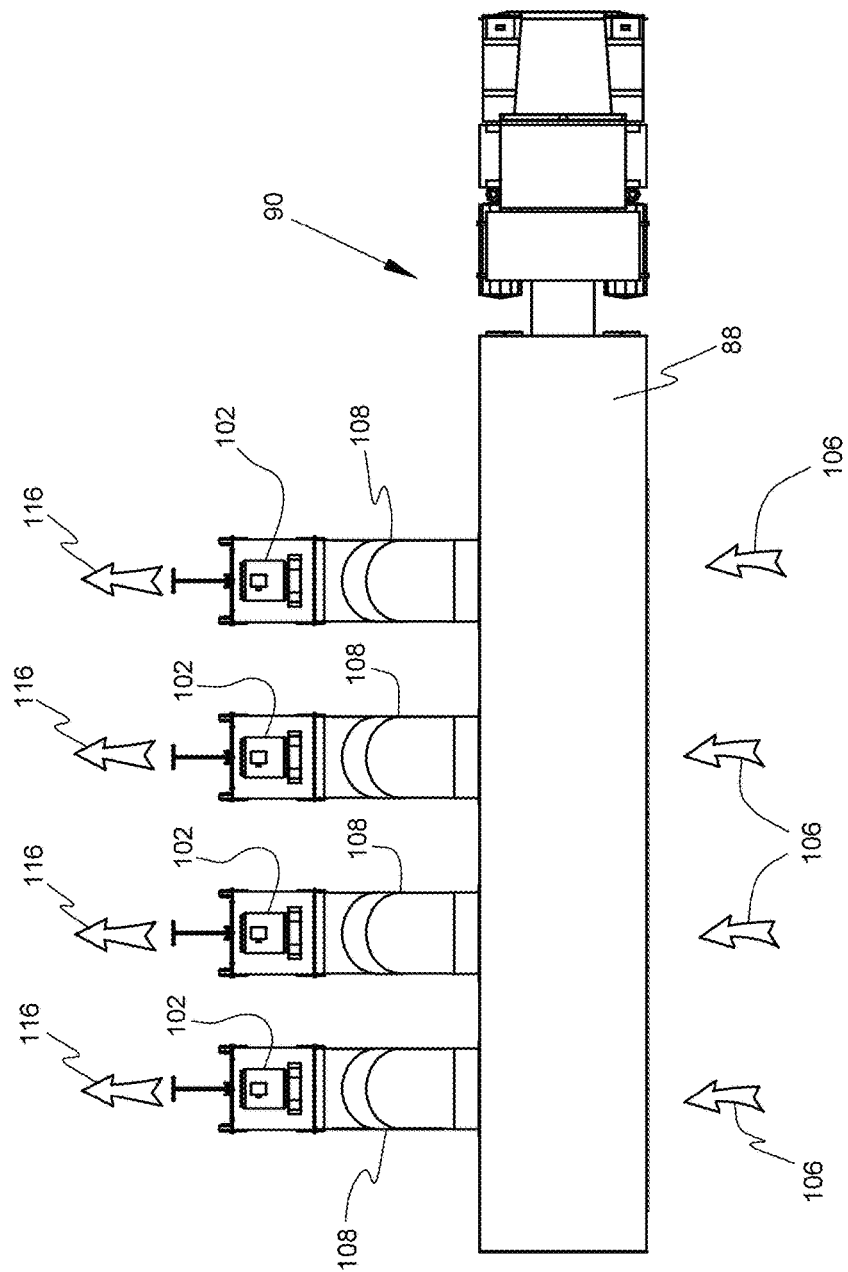
FIG. 14 is a top view of the paint spray booth of FIG. 13, but with only the fans, truck and trailer depicted.
Figure 15:
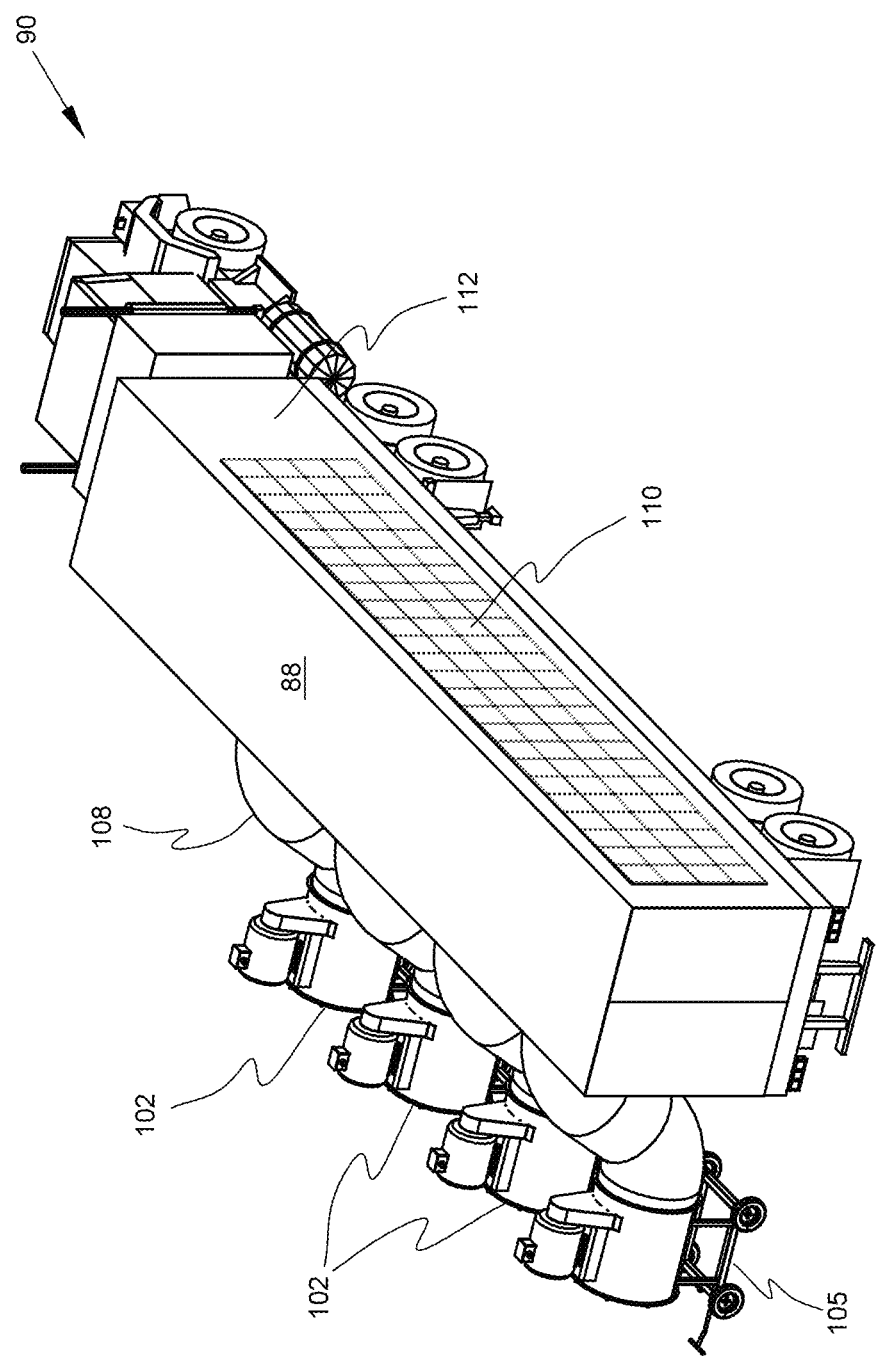
FIG. 15 is a back perspective view of FIG. 14.
Figure 16:
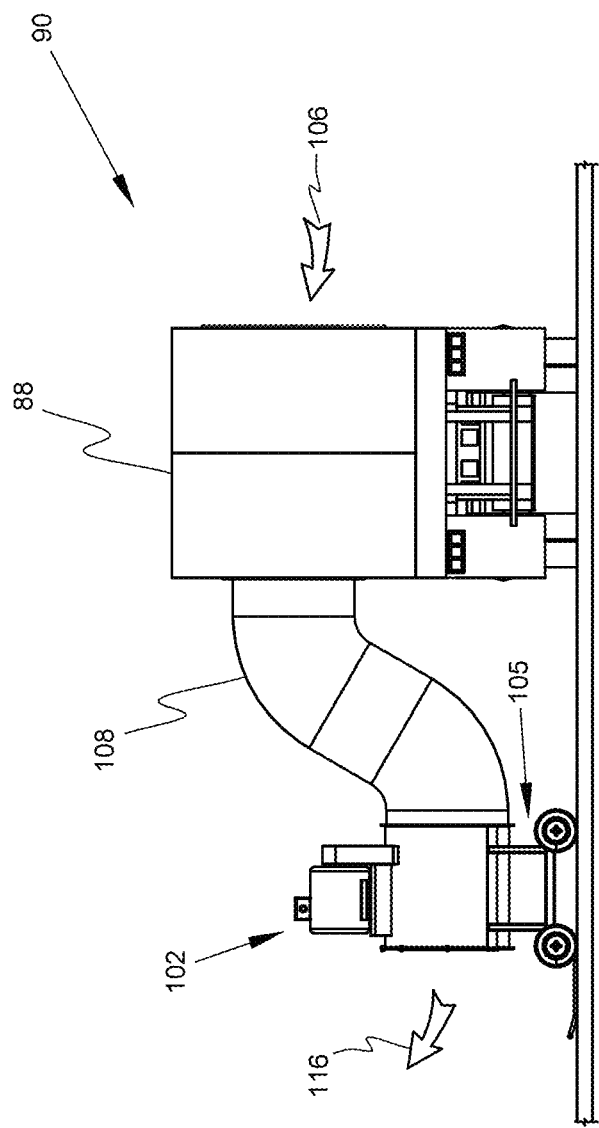
FIG. 16 is a back end elevation view of FIG. 14.
Figure 17:
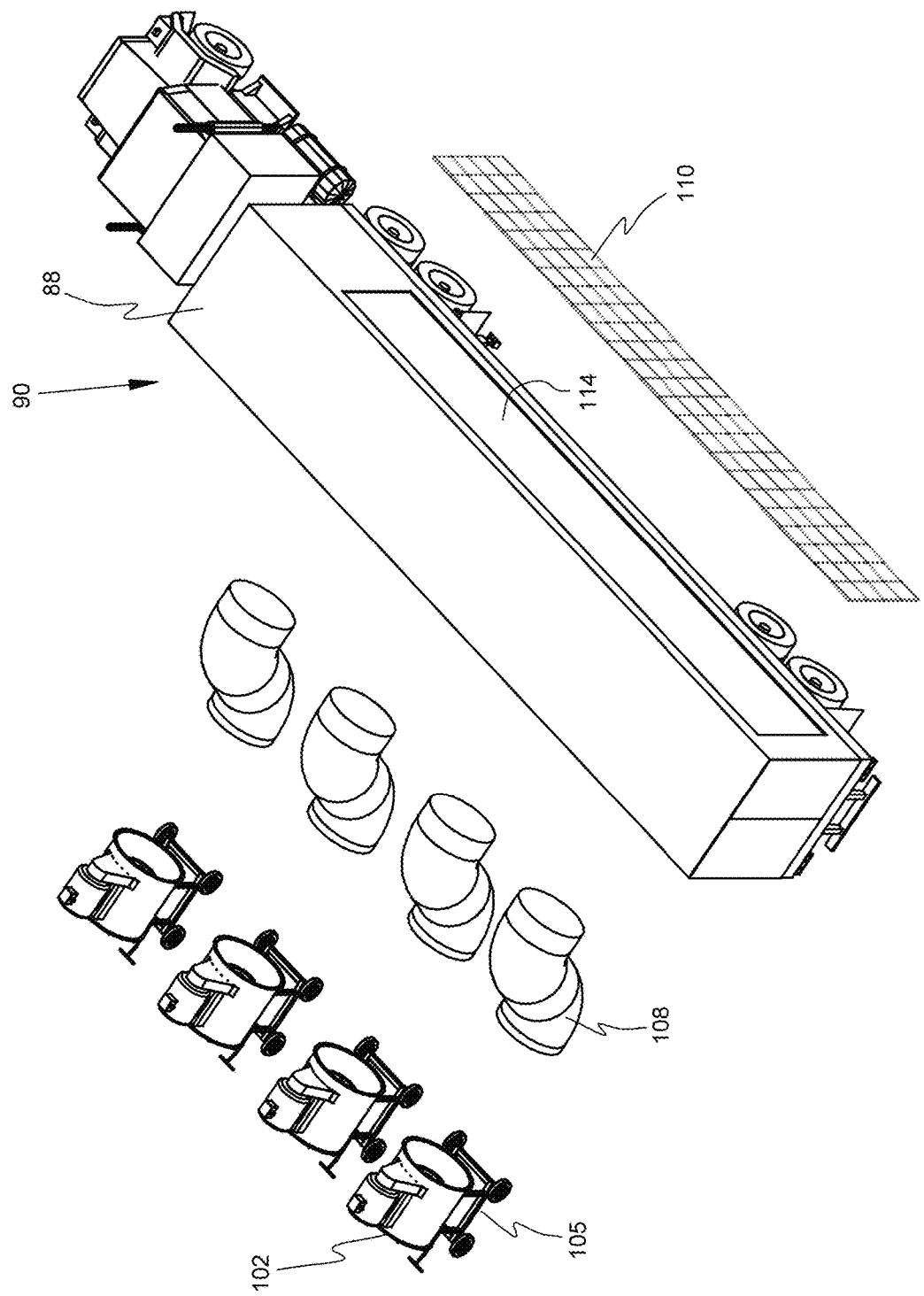
FIG. 17 is an exploded perspective view of FIG. 14.
Figure 22:
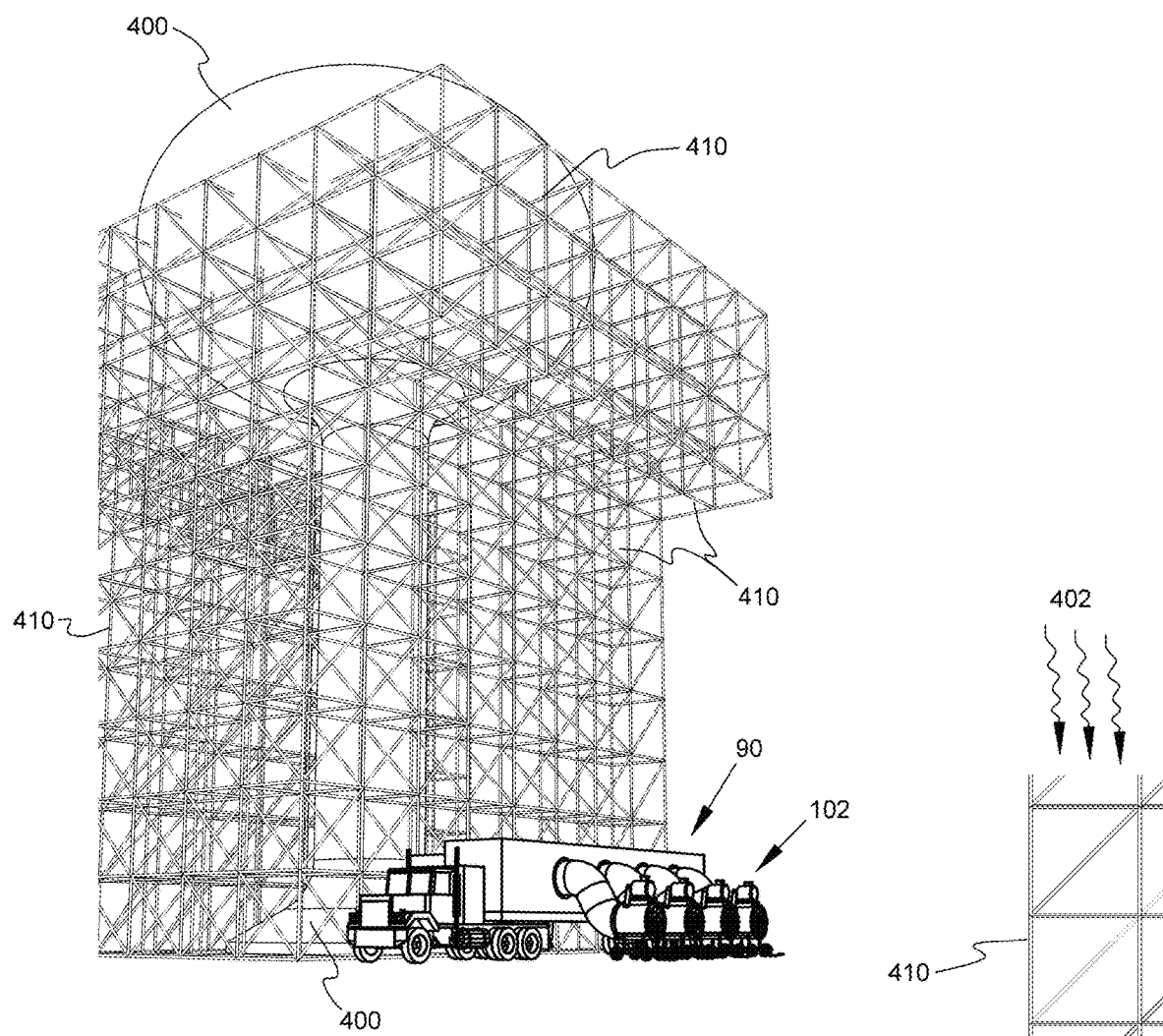
FIG. 22 is a perspective view of a water tower surrounded by a structure for supporting a canopy (not depicted) that receives forced air throughout the canopy via a suction truck trailer disposed at the base of the water tower in accordance with the present invention.
Figure 23:
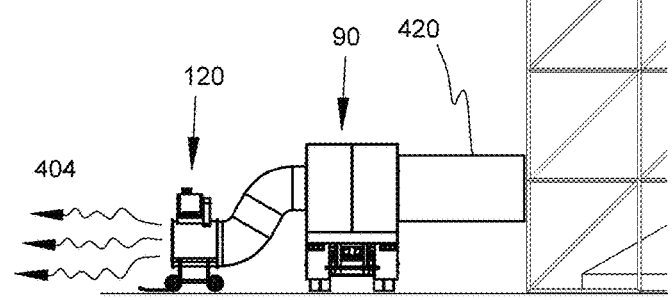
FIG. 23 is a side view of the truck trailer and a connection member for "sucking" air from a canopy for painting the water tower.
Figure 24:
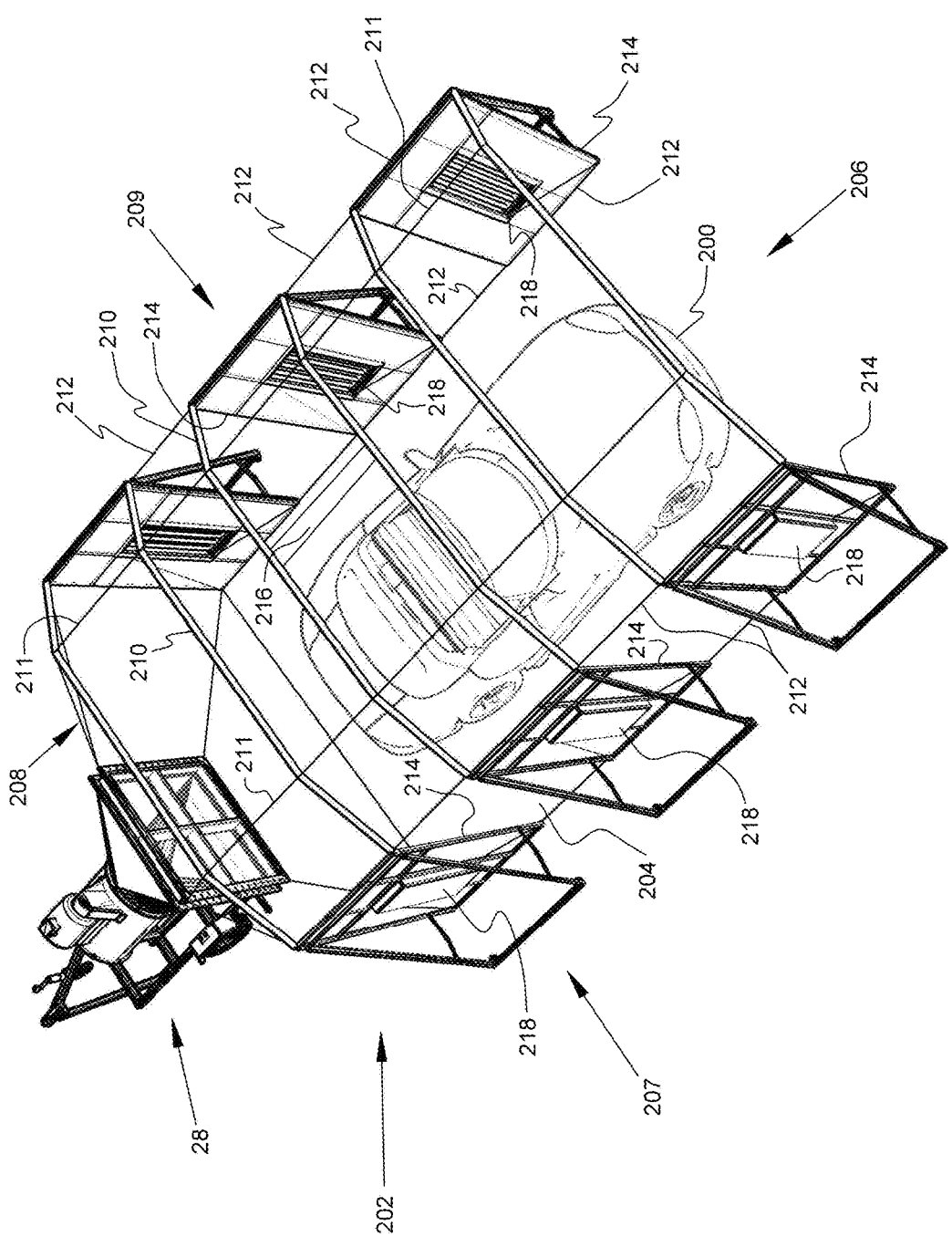
FIG. 24 is a perspective view of an alternative portable variable volume paint spray booth for painting automobiles in accordance with the present invention.
Figure 25:
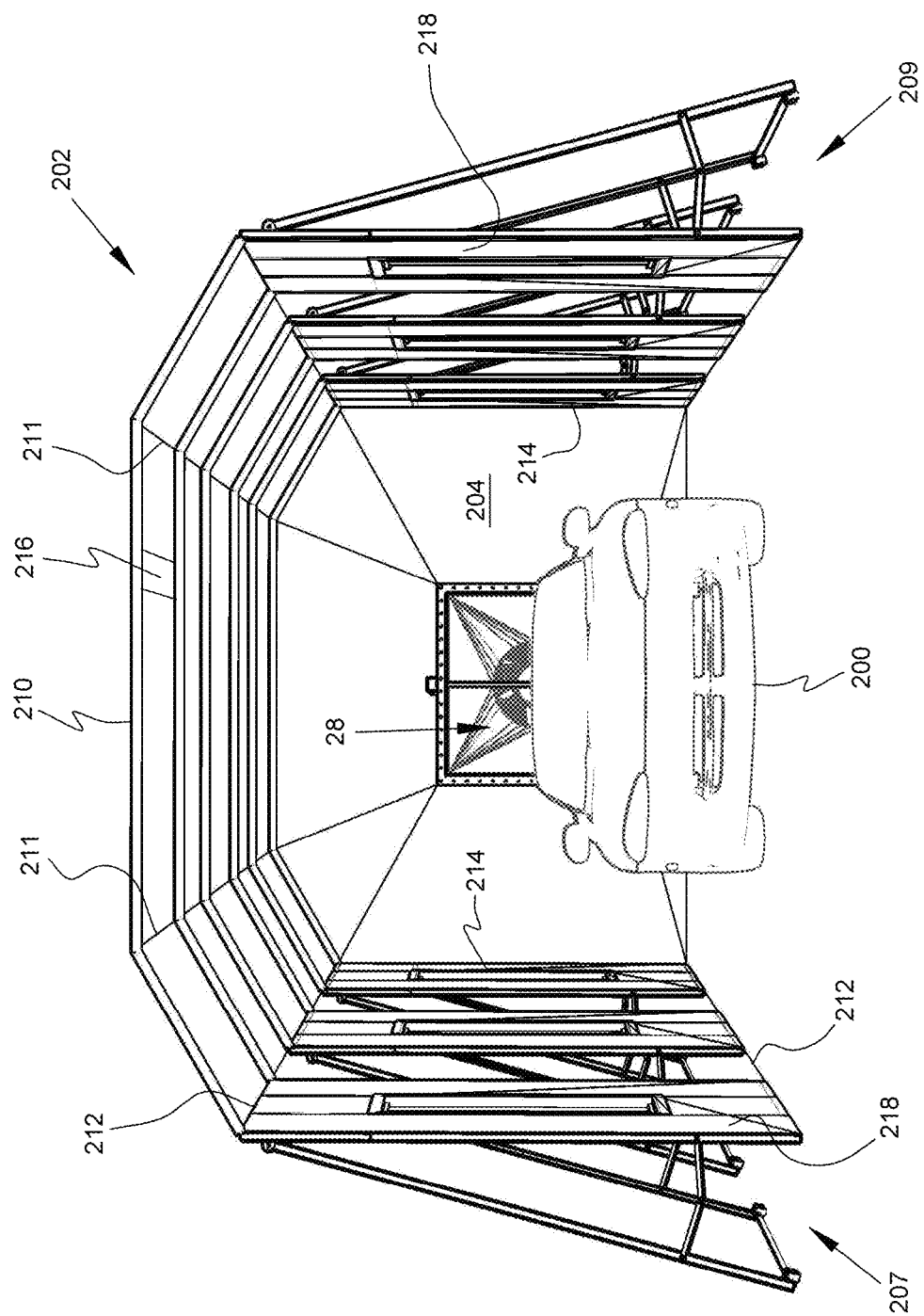
FIG. 25 is a front elevation view of the paint spray booth of FIG. 24.
Figure 26:
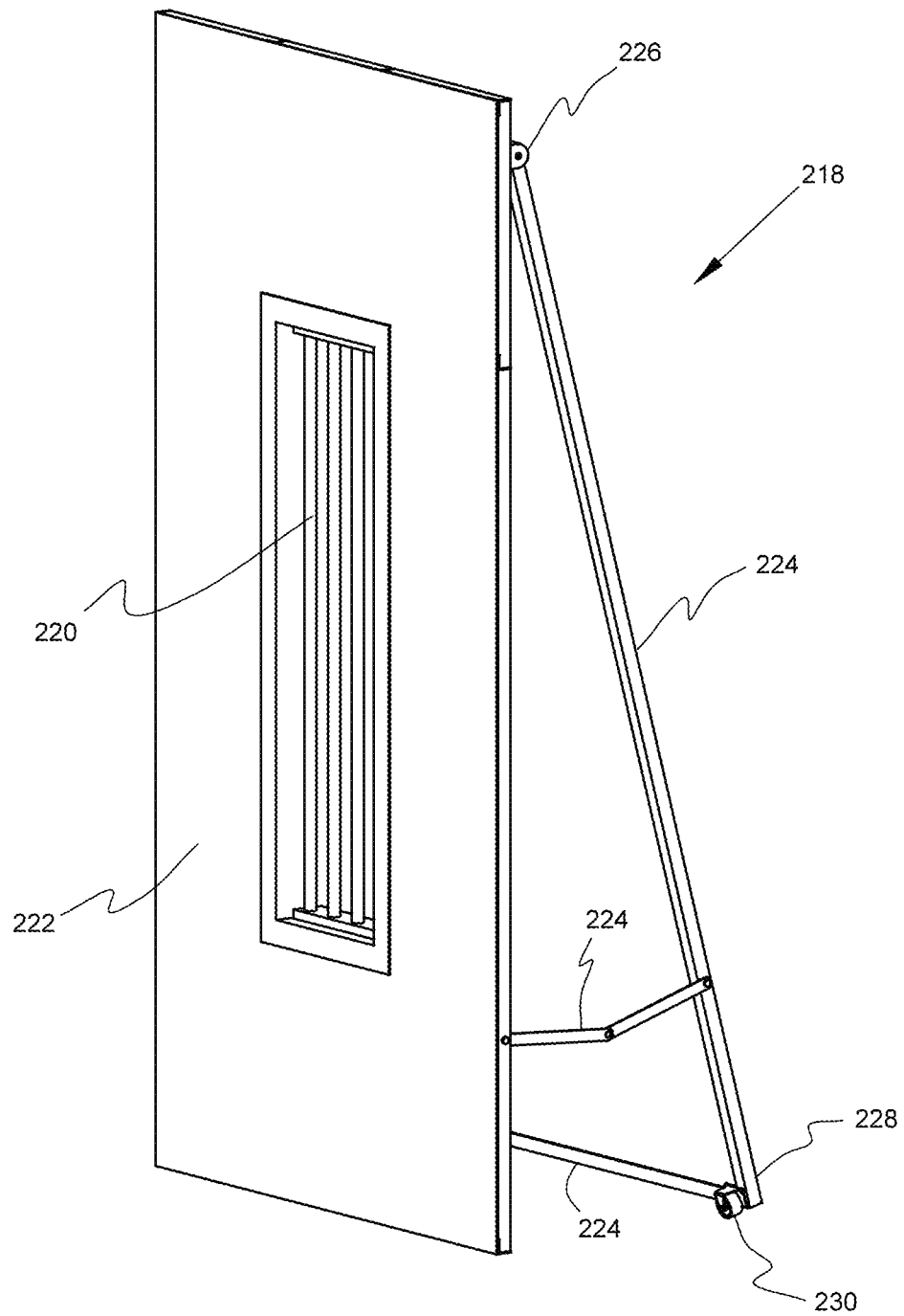
FIG. 26 is a perspective view of a side wall light fixture for the paint spray booth of FIG. 24 in accordance with the present invention.
Figure 28:
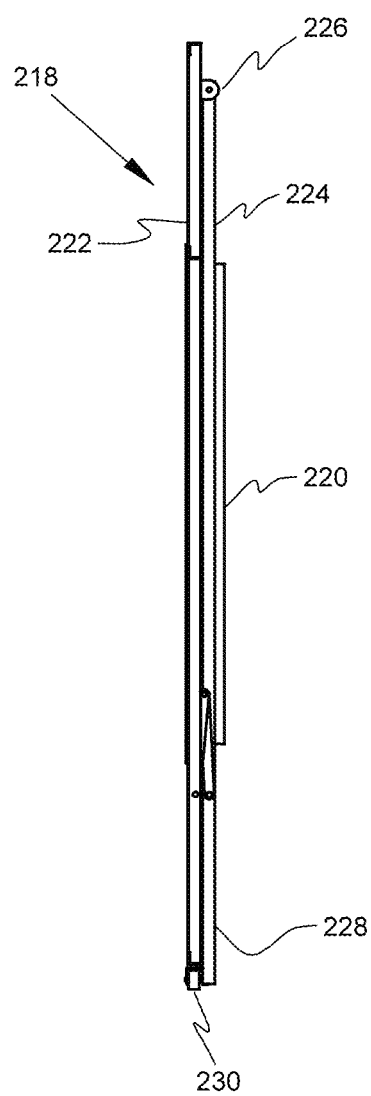
FIG. 28 is a side view of the light fixture of FIG. 27, but with the framework retracted.
Figure 27:
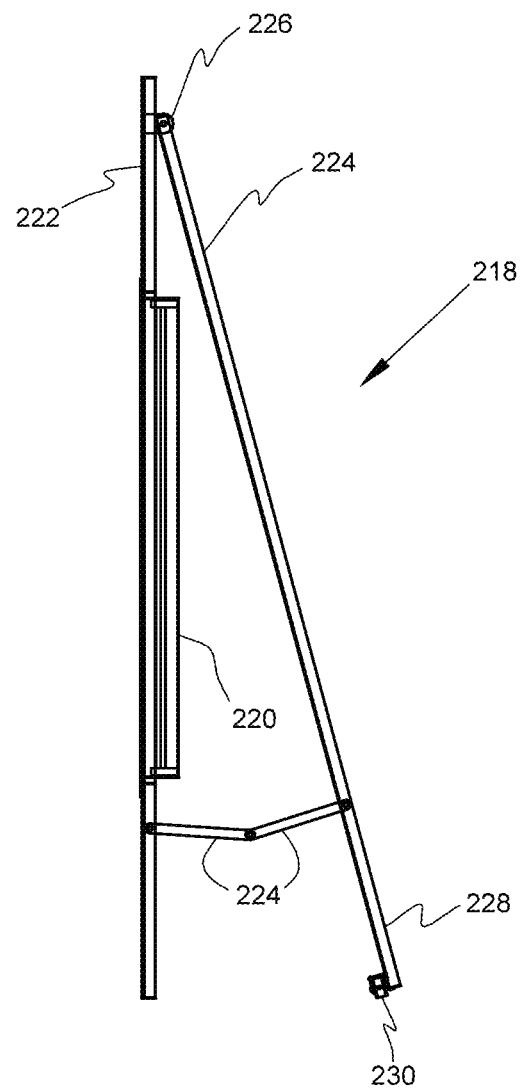
FIG. 27 is side elevation view of the light fixture of FIG. 26 with an extended framework for stabilizing the light fixture.
Figure 29:
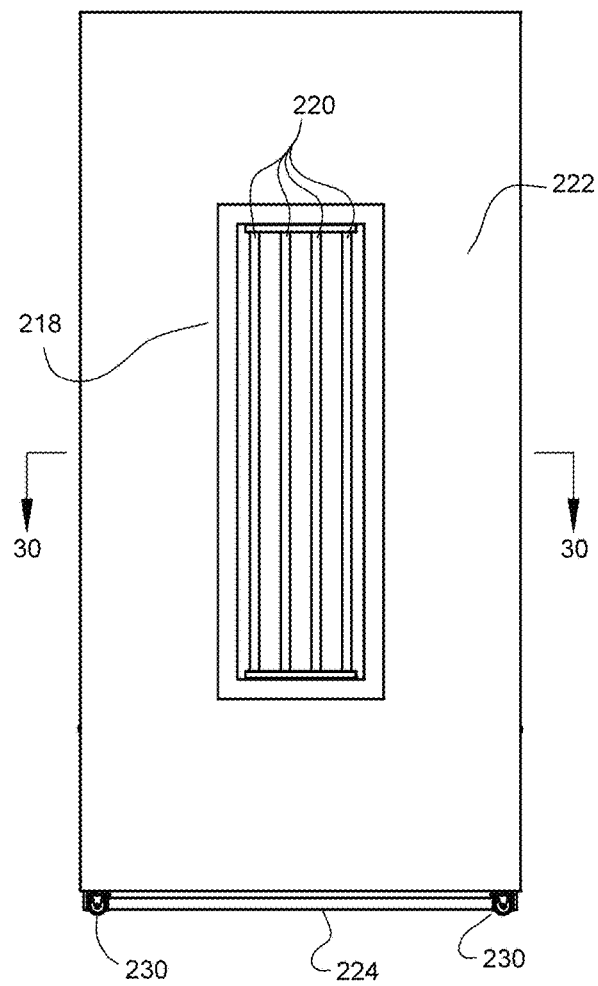
FIG. 29 is a front elevation view of the light fixture of FIG. 26.
Figure 30:
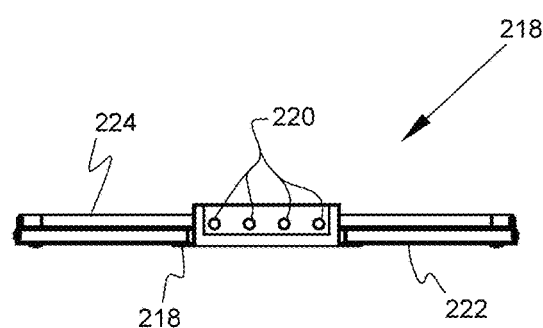
FIG. 30 is a side elevation view of the light fixture of FIG. 29.
Figure 31:
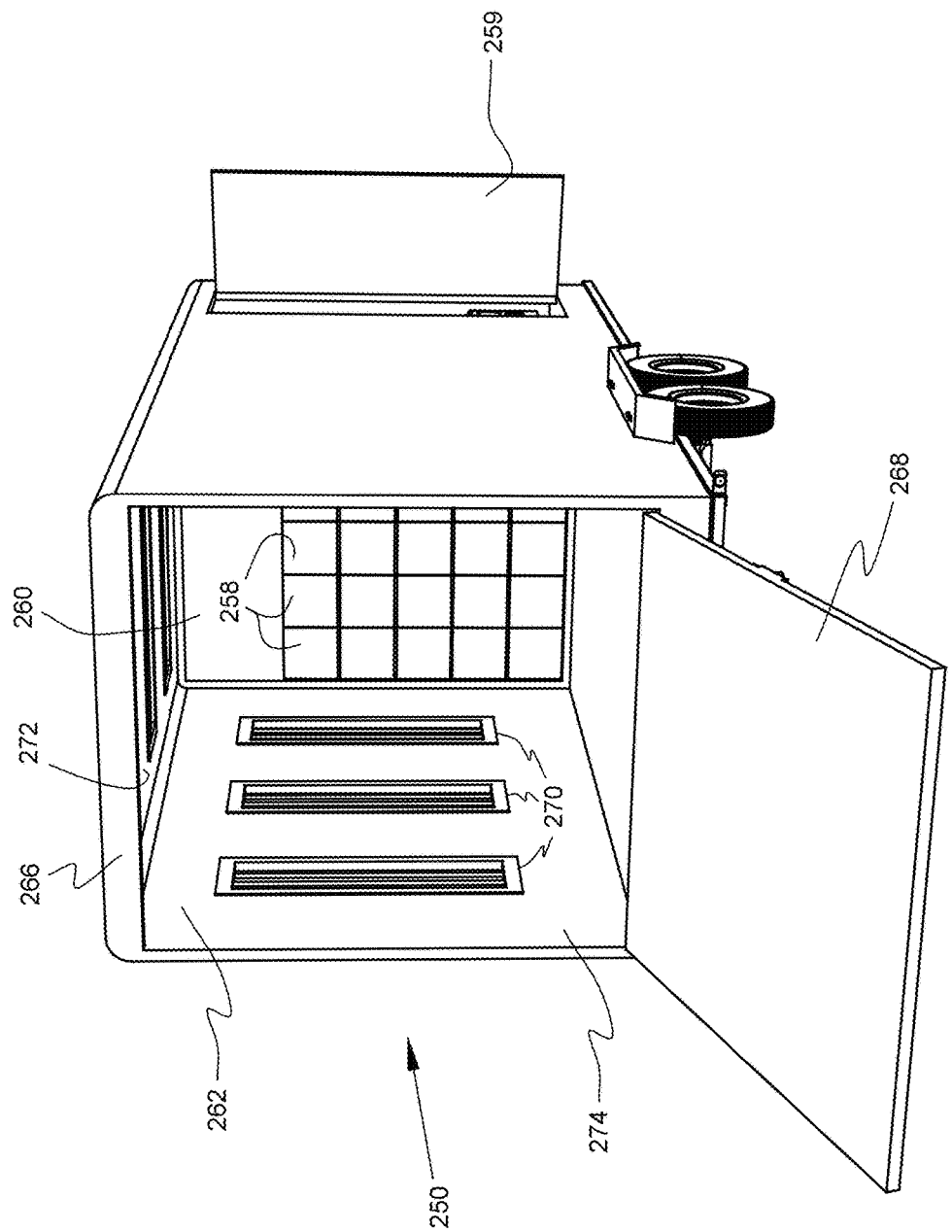
FIG. 31 is a back perspective view of a trailer paint spray booth/air scrubber for painting automobiles in accordance with the present invention.
Figure 32:
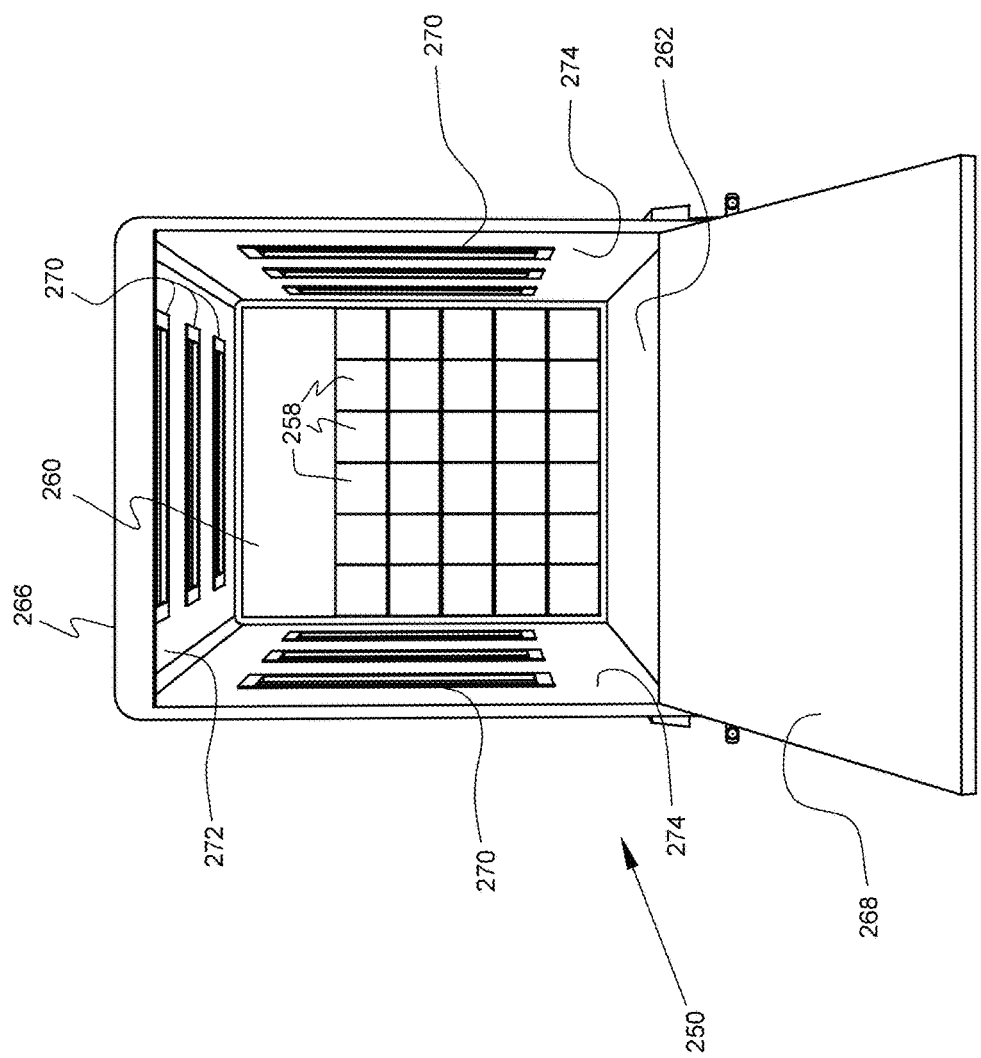
FIG. 32 is a back elevation view of the trailer of FIG. 31.
Figure 33:
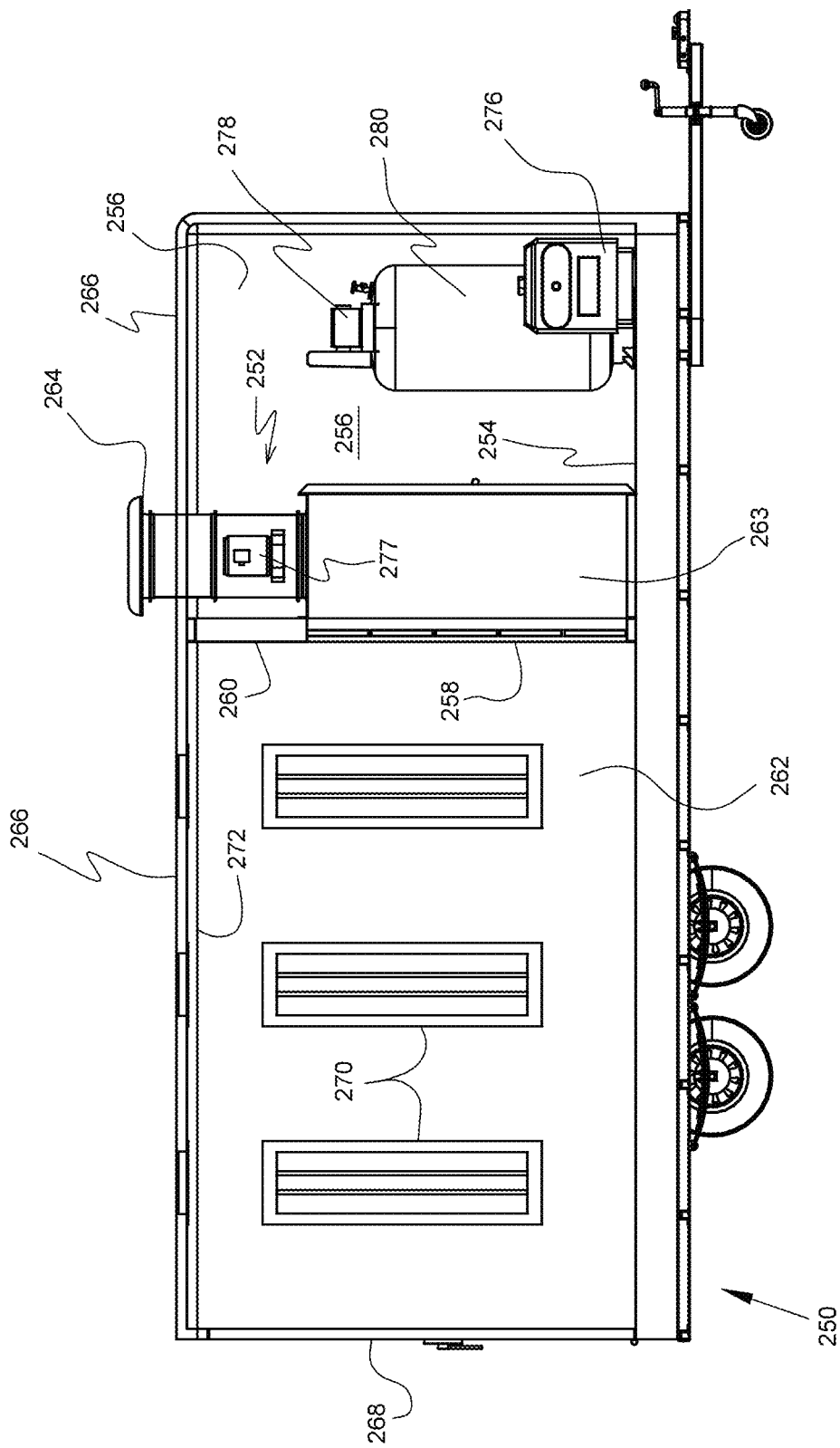
FIG. 33 is right side cut-away view of the trailer of FIG. 31 depicting the internal rooms of the trailer.
Figure 34:
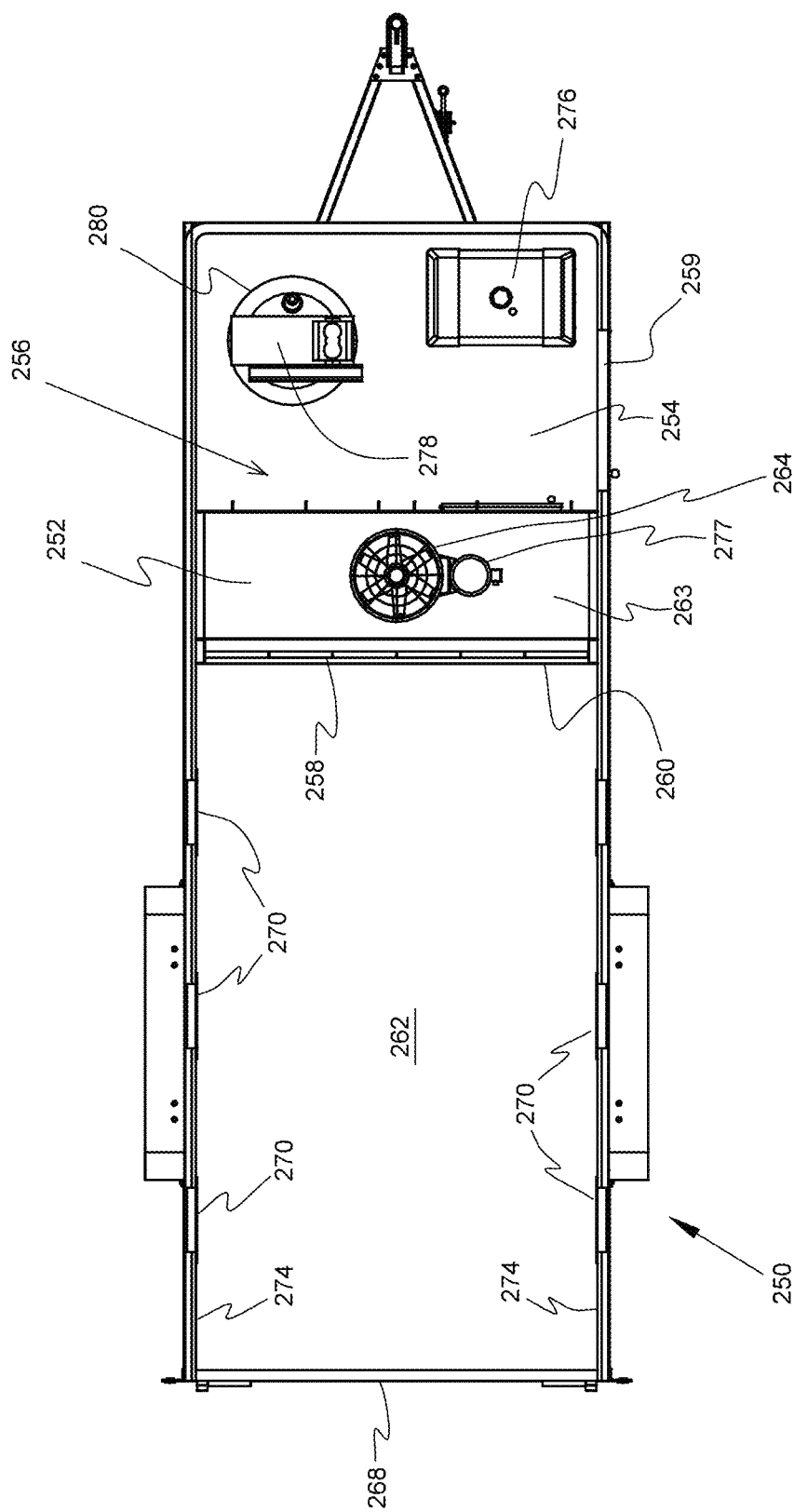
FIG. 34 is a top cut-away view of the trailer of FIG. 31 depicting the internal rooms of the trailer.
Figure 36:
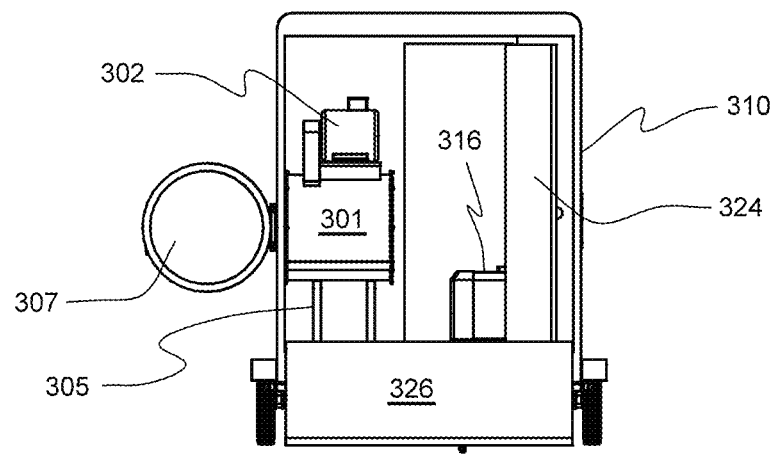
FIG. 36 is a back elevation view of the trailer of FIG. 35.
Figure 35:
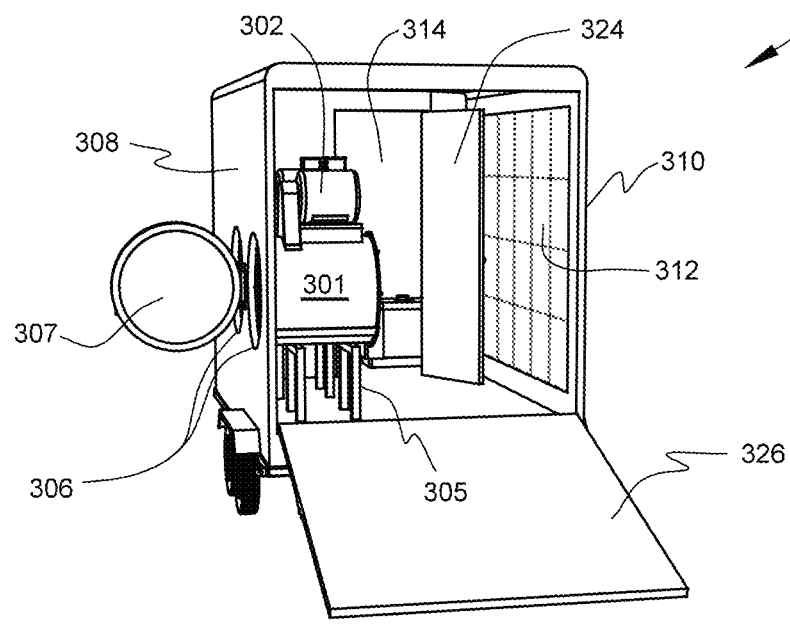
FIG. 35 is a back perspective view of a trailer paint spray booth/scrubber for painting relatively small objects in accordance with the present invention.
Figure 37:
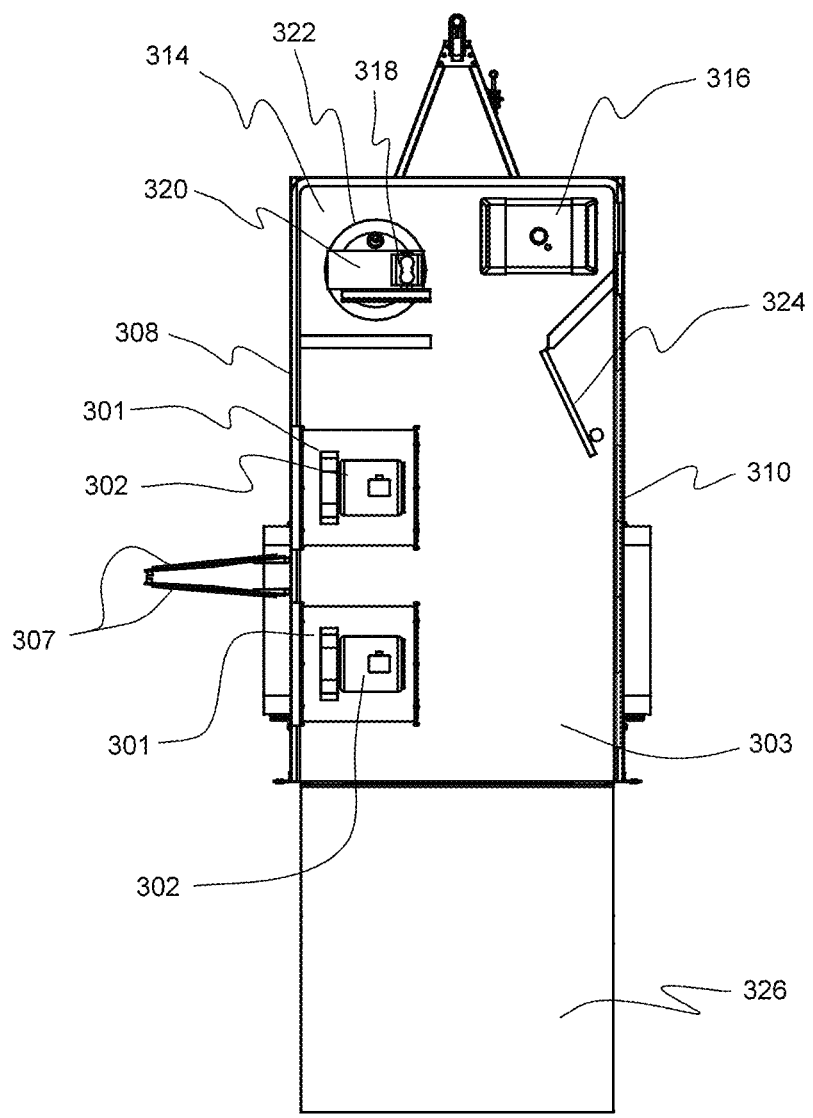
FIG. 37 is a top cut-away view of the trailer of FIG. 35 depicting the internal rooms of the trailer.
Figure 40:
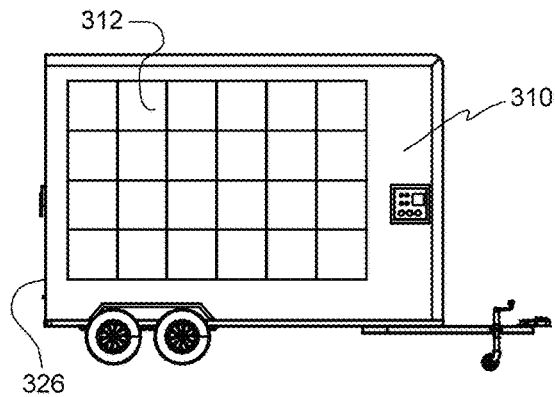
FIG. 40 is a left side elevation view of the trailer of FIG. 38.
Figure 41:
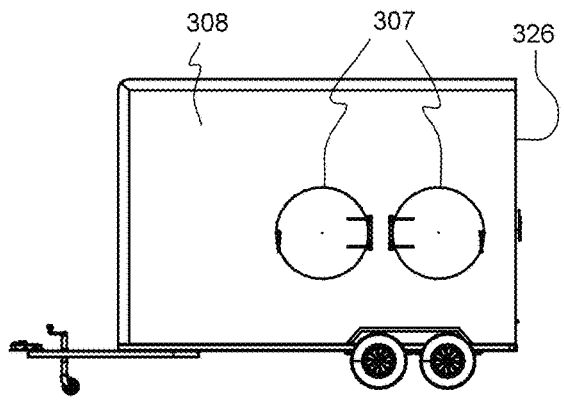
FIG. 41 is a right side elevation view of the trailer of FIG. 39.
Figure 38:
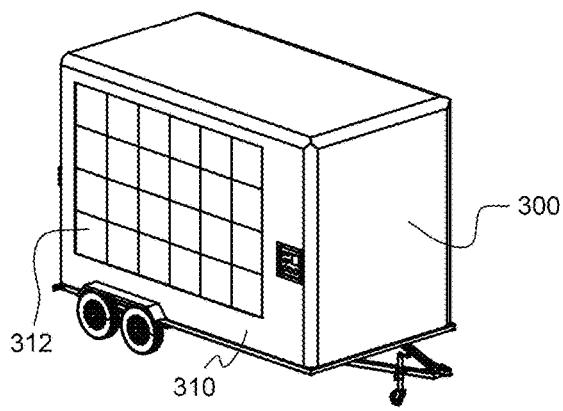
FIG. 38 is a front left side perspective view of the trailer of FIG. 35.
Figure 39:
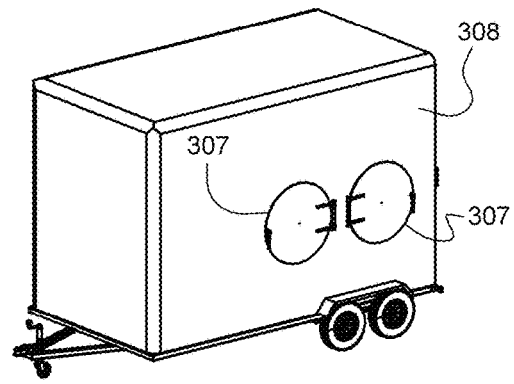
FIG. 39 is a front right side perspective view of the trailer of FIG. 35.

Referring to FIGS. 22 and 23, the adaptability of the present invention is illustrated by a water tower 400 (FIG. 22), and by a uniquely configured canopy support structure 410 surrounding the water tower 400 to promote the safe painting of the tower 400. A trailer 90-fan assembly 102 as depicted in FIG. 13 is adjacently disposed to the base of support structure 410. The volume of air required to be forced into 402 and out of 404 the canopy (not depicted) covered structure 410 to remove paint fumes generated within is readily calculated via means well known to those of ordinary skill in the art. Once the volume of air and rate of removal of the air under the covered structure is known, the required number of trailer 90-fan assemblies 102 is calculated and a corresponding number of connecting structures 420 to connect the trailers 90 to the canopy covered structure 410 without impeding air flow can be determined by those of ordinary skill in the art.

Referring to FIGS. 24-30, an alternative portable variable volume paint spray booth for painting automobiles 200 is denoted as numeral 202. The alternative paint spray booth for automobiles 202 includes the air extraction apparatus 28 (depicted in FIGS. 9-12 and described above) secured to an enclosure canopy 204 such that the air extraction apparatus 28 "sucks" air from an open first side 206 of the enclosure canopy 204, through the enclosure 204 with the automobile 200 being painted therein, and out an opposite second side wall 208 of the enclosure 204. The spray booth 202 is formed from the canopy 204 by a plurality of top arcuately configured non-compressible structural members 210 and longitudinal top lineal configured non-compressible structural members detachably secured between adjacent and parallel top members 210. In place of a longitudinal lineal structural member, a cable 211 can be used to provide support for a canopy enclosure 204 "draped" upon all structural members to form the portable variable volume paint spray booth 202. The arcuately configured structural members 210 are detachably secured to respective horizontal and vertical structural members 212 and 214 that ultimately form third and fourth side walls 207 and 209 for the enclosure canopy 204.

All structural members are fabricated from metal and preferably from lightweight aluminum to promote faster assembly of the spray booth 202. The structural members cooperate dimensionally to provide a space inside the enclosure canopy 204 that promotes efficient painting of the vehicle 200 therein and removes a potentially explosive "paint atmosphere" from the inside of the canopy 204 in a minimum amount of time. The distance between the vehicle 200 in the enclosure canopy 204 and the walls and ceiling of the enclosure 204 is substantially three feet to enable a user to freely move about a vehicle 200 being painted. To enable a user of the spray booth 202 to construct the enclosure 204 in a minimum amount of time, and/or to enable a spray booth 202 to be used for a myriad of vehicles with varying dimensions, all structural members 210, 212 and 214 are longitudinally extendable to attain the three feet of user space. The extending or reducing the longitudinal dimensions of the structural members 210, 212 and 214 can be achieved via means well known to those of ordinary skill in the art.

The paint spray booth 202 further includes a plurality of explosion proof lights 216 (well known to those of ordinary skill in the art) detachably secured to the top structural members 210 and/or 211 inside the canopy 204, and a plurality of explosion proof lights 218 (well known to those of ordinary skill in the art) detachably secured to side wall horizontal and vertical structural members 212 and 214. All lights 216 and 218 are powered by 120 VAC or less, which is provided by extension cords.

The side wall explosion proof lights 218 are constructed such that the lights can be vertically disposed inside the enclosure canopy 204 and detachably secured via wires or similar means to adjacently and vertically disposed structural support members 214. Alternatively, the preferred location for the side wall explosion proof lights 218 is in the side walls detachably secured to the horizontal and vertical structural members 212 and 214 as depicted in FIGS. 22 and 23. The side wall explosion proof lights 218 include one or more lights 220 detachably secured to a light fixture 222 having a longitudinally extendable framework 224 pivotally connected to an upper portion 226 of the fixture 222 such that the light fixture 222 is maintained in a substantially vertical position when a bottom portion 228 of the framework 224 is horizontally separated from the light fixture 222, then longitudinally extended to engage a ground portion, thereby simultaneously maintaining the vertical position of the light fixture 222 and stabilizing structural integrity of the side walls of the spray booth 202.

Referring to FIGS. 31-34, a trailer paint spray booth for painting automobiles (not depicted) is denoted as numeral 250. The trailer paint spray booth 250 is sized for a predetermined group of automobiles and includes air extraction apparatus 252 (similar to the air extraction apparatus 28 depicted in FIGS. 9-12 and described above) secured to a floor portion 254 in a utility room 256 of the trailer paint booth 250. The utility room 256 is accessible by operating personnel via a door 259 to enable inspections of the equipment therein. The air extraction apparatus 252 is disposed adjacent to a plurality of inlet filters 258 (well known to those of ordinary skill in the art) forming an inner wall 260 that separates the utility room 256 from a paint room 262. The inlet filters 258 supply a relatively large quantity of airflow at atmospheric pressure into the inlet side of the air extraction apparatus 252 in the utility room 256, resulting in a relatively large quantity of airflow at vacuum pressure flowing through the enclosure paint room 262 that "pulls" paint fumes and particulates in the airflow through the inlet filters 258, thereby removing the paint fumes and particulates from the airflow and forcing the filtered air from the enclosure trailer 250 via a fan portion 263 of the air extraction apparatus 252 that urges the filtered air out a discharge port 264 connected to the exhaust of the air extraction apparatus 252, the discharge port 264 extending thought the roof 266 of the trailer 250.

The trailer paint spray booth 250 further includes a retractable ramp 268 for allowing an automobile to enter the paint room 262, multiple explosion proof light fixtures 270 secured to the inner ceiling 272 and inner side walls 274 that form the paint room 262, a generator 276 for providing power to a motor drive 277 for the fan portion 263, light fixtures 270 and a motor drive 278 for a compressor supplying air to a pressurized air storage tank 280 thereby, enabling said trailer paint spray enclosure to operate in remote areas where electrical power is not available. The air tank 280 supplies pneumatic tools for painting a vehicle once inside the trailer paint spray booth 250.

Referring to FIGS. 35-41, a trailer paint spray booth for painting relatively small objects is denoted as numeral 300. The trailer paint spray booth 300 includes two air extraction fan 301-motor 302 combinations elevated and secured to the floor 304 of a paint room 303 of the spray booth 300 by steel "legs" 305, such that both fan discharge ports are adjacently disposed with cooperatively sized aperture 306 in a first side wall 308 of the booth 300. The apertures 306 include port covers 307 to prevent rain and dust from entering the paint room 303 when the fans 301 are not operating. A second side wall 310 of the booth 300 includes a plurality of air filters 312 that allow air flow into the paint room 303 when the fan-motor combinations 302 are operating to remove paint fumes from the paint room 303 when objects are being painted therein.

The trailer paint spray booth 300 further includes a utility room 314 containing a generator 316 for providing power to the fan motors 302, light fixtures (not depicted) and a motor drive 318 for a compressor 320 supplying air to a pressurized air storage tank 322. The air tank 322 provides pressurized air to pneumatic tools for painting objects inside the trailer paint spray booth 300. An access door 324 allows an operator to step from the paint room 303 into the utility room 314 to energize the equipment therein. A retractable ramp 326 allows a user of the booth 300 to deposit objects in the paint room 303; whereupon, the port covers 307 are opened, the motors 302 are energized and the access door 324 and ramp 326 are closed, thereby allowing air flow only through the filters 312 that combines with paint fumes in the paint room 313 to ultimately be extracted via the extraction fans 301 to prevent an explosive air-paint fume combination from occurring in the paint room 303.

Figure 43:
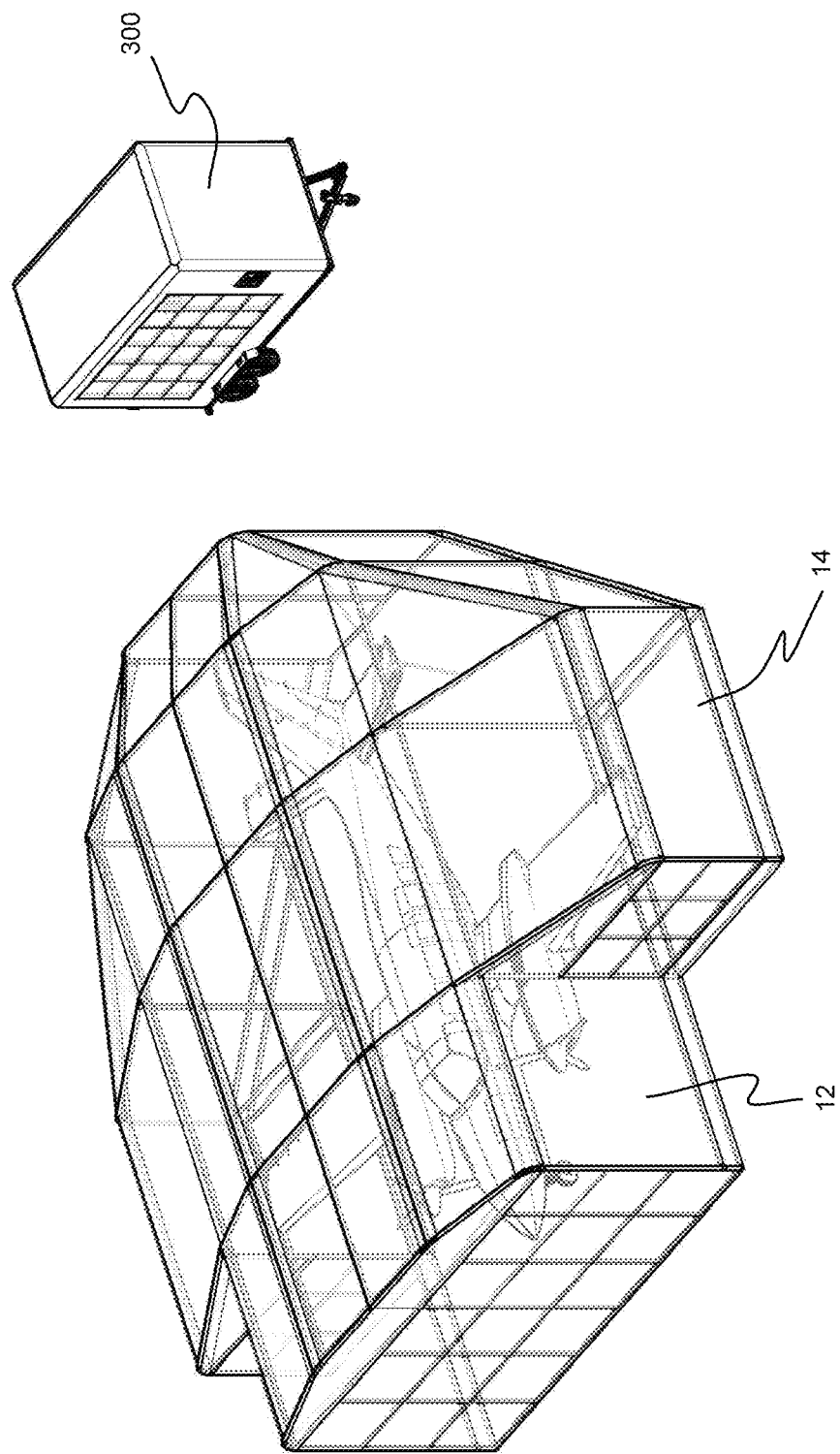
FIG. 43 is a perspective view of the airplane and enclosure of FIG. 42 detached from the trailer paint spray booth/air scrubber of FIGS. 35-41.

Referring to FIGS. 42 and 43, the airplane 12 and enclosure 14 of FIG. 1 are depicted connected to and separated from the trailer paint spray booth 300 in FIGS. 35-41. The construction of the trailer paint spray booth 300 enables the booth 300 to function as an air scrubber. More specifically, the paint spray booth and air scrubber 300, after being sized to provide a predetermined air flow, can be connected to any enclosure varying in size and configuration, or can act as a standalone air scrubber after being by a user as illustrated in FIG. 9A.

The foregoing description is for the purpose of illustration only and is not intended to limit the scope of protection accorded this invention. The scope of protection is to be measured by the following claims, which should be interpreted as broadly as the inventive contribution permits.

The invention claimed is:

1. A transportable paint spray device comprising:
   a truck-trailer having a side wall with an aperture to receive air filters secured to said side wall for allowing air into said truck-trailer, said air filters ultimately removing particulates and paint vapor from air entering said truck-trailer;
   a paint spray booth for a predetermined object to be painted, said paint spray booth being cooperatively secured to said side wall of said truck-trailer such that air exiting said paint spray booth enters said truck-trailer; and
   an air extraction apparatus for urging air from said paint spray booth, through said air filters and into said truck-trailer, said air extraction apparatus including a plurality of motorized fans connected via trailer connection tubes to apertures in a wall opposite said side wall of said truck-trailer to enable said plurality of motorized fans to urge filtered air from said truck-trailer to the atmosphere, said plurality of motorized fans being secured to a floor portion inside said truck-trailer, said motorized fans being connected via said trailer connection tubes to said apertures in said wall opposite said side wall of said truck-trailer, thereby allowing said motorized fans to operate when weather conditions include rain and/or snow, whereby air mixed with vaporized paint inside said paint spray booth is removed from said paint spray booth and urged into said truck-trailer before a paint vapor and air mixture rises above a predetermined low level explosion setpoint corresponding to the paint vapor and air mixture, thereby preventing an explosion and/or fire from occurring inside said paint spray booth and preventing operator exposure to harmful fumes; whereupon, filtered air inside the truck-trailer is ultimately removed from said truck-trailer via said air extraction apparatus and discharged back to the atmosphere.

2. The transportable paint spray device of claim 1 wherein said plurality of motorized fans are secured to a lockable wheel base for promoting movement of said motorized fans outside said truck-trailer to optimized the position of said motorized fans relative to said truck-trailer.

3. The transportable paint spray device of claim 1 wherein said paint spray booth is cooperatively secured to respective side walls of multiple truck-trailers, each truck-trailer having a side wall with an aperture to receive air filters secured to said side wall for allowing air into each of said truck-trailers, whereby, air exiting said enclosure enters said multiple truck-trailers to enable said plurality of motorized fans for each truck-trailer to urge filtered air from each of said truck-trailers to the atmosphere.

4. A transportable paint spray device comprising:
   a truck-trailer having a side wall with an aperture to receive air filters secured to said side wall for allowing air into said truck-trailer, said air filters ultimately removing particulates and paint vapor from air entering said truck-trailer;
   a paint spray booth for a predetermined object to be painted, said paint spray booth being cooperatively secured to said side wall of said truck-trailer such that air exiting said paint spray booth enters said truck-trailer; and
   an air extraction apparatus for urging air from said paint spray booth, through said air filters and into said truck-trailer, said air extraction apparatus including a plurality of motorized fans connected via trailer connection tubes to apertures in a wall opposite said side wall of said truck-trailer to enable said plurality of motorized fans to urge filtered air from said truck-trailer to the atmosphere, said plurality of motorized fans being secured to a slidable floor portion inside said truck-trailer, thereby promoting the positioning of said motorized fans outside said truck-trailer upon opening an outside door of said truck-trailer, resulting in the truck-trailer being used to paint objects inside said truck-trailer when said truck-trailer is detached from said paint spray booth, whereby air mixed with vaporized paint inside said paint spray booth is removed from said paint spray booth and urged into said truck-trailer before a paint vapor and air mixture rises above a predetermined low level explosion setpoint corresponding to the paint vapor and air mixture, thereby preventing an explosion and/or fire from occurring inside said paint spray booth and preventing operator exposure to harmful fumes; whereupon, filtered air inside the truck-trailer is ultimately removed from said truck-trailer via said air extraction apparatus and discharged back to the atmosphere.

* * * * *